US008121917B2

(12) United States Patent
Insolia et al.

(10) Patent No.: US 8,121,917 B2
(45) Date of Patent: Feb. 21, 2012

(54) SYSTEMS FOR IMPLEMENTING A LOYALTY PROGRAM

(75) Inventors: Gerard E. Insolia, Atlanta, GA (US); Leonard Frank Antao, Smyrna, GA (US); Anthony James Phillips, Marietta, GA (US); Haven Brock Kolls, Alpharetta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 12/041,041

(22) Filed: Mar. 3, 2008

(65) Prior Publication Data
US 2009/0222340 A1 Sep. 3, 2009

(51) Int. Cl.
*G06Q 40/00* (2006.01)
(52) U.S. Cl. ........... 705/35; 705/14; 705/14.41; 705/15; 705/26; 705/39; 705/40; 705/64; 707/200; 221/150 R; 235/280; 709/203; 709/218; 709/220
(58) Field of Classification Search .............. 705/14, 705/14.41, 15, 26, 39, 40, 64; 707/200; 221/150 R; 235/280; 709/203, 218, 220
See application file for complete search history.

(56) References Cited

U.S. PATENT DOCUMENTS

| | | |
|---|---|---|
| 4,876,441 A | 10/1989 | Hara et al. |
| 5,398,799 A | 3/1995 | Ranon et al. |
| 5,557,529 A | 9/1996 | Warn et al. |
| 5,619,024 A | 4/1997 | Kolls |
| 5,637,845 A | 6/1997 | Kolls |
| 5,655,961 A | 8/1997 | Acres et al. |
| 5,682,027 A | 10/1997 | Bertina et al. |
| 5,812,643 A | 9/1998 | Schelberg, Jr. et al. |
| 5,828,044 A | 10/1998 | Jun et al. |
| 5,844,808 A | 12/1998 | Konsmo et al. |
| 5,870,722 A | 2/1999 | Albert et al. |
| 5,880,454 A | 3/1999 | Monicault |
| 5,889,266 A | 3/1999 | Schrenk |
| 5,907,801 A | 5/1999 | Albert et al. |
| 5,959,869 A | 9/1999 | Miller et al. |
| 6,012,635 A | 1/2000 | Shimada et al. |
| 6,026,370 A * | 2/2000 | Jermyn ........................ 705/14 |

(Continued)

FOREIGN PATENT DOCUMENTS

WO 96/18980 A1 6/1996

(Continued)

OTHER PUBLICATIONS

Coutaz, Joelle's NPL article: "Software Architecture Modeling for User Interfaces", published on Jan. 15, 2002.*

(Continued)

*Primary Examiner* — James Trammell
*Assistant Examiner* — Sanjeev Malhotra
(74) *Attorney, Agent, or Firm* — Sutherland Asbill & Brennan LLP

(57) ABSTRACT

A system for implementing a loyalty program includes a personal terminal, an interaction terminal, and a loyalty module. The personal terminal may be associated with a user. The interaction terminal may be associated with a product or service. The interaction terminal and the personal terminal may be operable to establish a communication when in proximity of each other. The loyalty module may be operable to provide a benefit to the user in response to the communication. The benefit may be provided without regard to whether the user obtained or purchased the product or service.

20 Claims, 27 Drawing Sheets

U.S. PATENT DOCUMENTS

| | | | |
|---|---|---|---|
| 6,038,491 A | 3/2000 | McGarry et al. | |
| 6,056,194 A | 5/2000 | Kolls | |
| 6,061,668 A | 5/2000 | Sharrow | |
| 6,085,983 A | 7/2000 | Curry et al. | |
| 6,095,412 A | 8/2000 | Bertina et al. | |
| 6,119,053 A | 9/2000 | Taylor et al. | |
| 6,119,934 A | 9/2000 | Kolls | |
| 6,145,739 A | 11/2000 | Bertina et al. | |
| 6,152,365 A | 11/2000 | Kolls | |
| 6,169,483 B1 | 1/2001 | Ghaffari et al. | |
| 6,182,900 B1 | 2/2001 | Wiehler | |
| 6,254,006 B1 | 7/2001 | Mish | |
| 6,321,985 B1 | 11/2001 | Kolls | |
| 6,331,972 B1 | 12/2001 | Harris et al. | |
| 6,366,220 B1 | 4/2002 | Elliott | |
| 6,382,507 B2 | 5/2002 | Schilling | |
| 6,390,375 B2 | 5/2002 | Kayanakis | |
| 6,414,441 B1 | 7/2002 | Fries et al. | |
| 6,418,326 B1 | 7/2002 | Heinonen et al. | |
| 6,424,884 B1 | 7/2002 | Brooke, Jr. et al. | |
| 6,427,912 B1 | 8/2002 | Levasseur | |
| 6,457,038 B1 | 9/2002 | Defosse | |
| 6,462,644 B1 | 10/2002 | Howell et al. | |
| 6,505,095 B1 | 1/2003 | Kolls | |
| 6,547,040 B2 | 4/2003 | Goodwin, III | |
| 6,601,037 B1 | 7/2003 | Kolls | |
| 6,604,087 B1 | 8/2003 | Kolls | |
| 6,604,679 B2 | 8/2003 | Morooka et al. | |
| 6,622,914 B2 | 9/2003 | Hosogoe | |
| 6,640,214 B1 | 10/2003 | Nambudiri et al. | |
| 6,647,256 B1 | 11/2003 | Stewen et al. | |
| 6,663,006 B2 | 12/2003 | Mullins et al. | |
| 6,684,200 B1 | 1/2004 | Koga | |
| 6,732,923 B2 | 5/2004 | Otto | |
| 6,748,296 B2 | 6/2004 | Banerjee et al. | |
| 6,752,321 B1 | 6/2004 | Leaming | |
| 6,755,341 B1 | 6/2004 | Wong et al. | |
| 6,763,094 B2 | 7/2004 | Conn et al. | |
| 6,771,981 B1 | 8/2004 | Zalewski et al. | |
| 6,772,048 B1 | 8/2004 | Leibu et al. | |
| 6,776,339 B2 | 8/2004 | Piikivi | |
| 6,799,726 B2 | 10/2004 | Stockhammer | |
| 6,811,078 B2 | 11/2004 | Workens | |
| 6,813,609 B2 | 11/2004 | Wilson | |
| 6,816,083 B2 | 11/2004 | Brandt | |
| 6,823,188 B1 | 11/2004 | Stern | |
| 6,836,468 B1 | 12/2004 | O'Toole et al. | |
| 6,836,472 B2 | 12/2004 | O'Toole et al. | |
| 6,853,605 B2 | 2/2005 | Fujisawa et al. | |
| 6,857,566 B2 | 2/2005 | Wankmueller | |
| 6,859,650 B1 | 2/2005 | Ritter | |
| 6,892,052 B2 | 5/2005 | Kotola et al. | |
| 6,898,440 B2 | 5/2005 | Chen et al. | |
| 6,934,532 B2 | 8/2005 | Coppinger et al. | |
| 6,934,689 B1 | 8/2005 | Ritter et al. | |
| 6,959,230 B1 | 10/2005 | Leibu et al. | |
| 6,973,478 B1* | 12/2005 | Ketonen et al. | 709/203 |
| 6,988,657 B1 | 1/2006 | Singer et al. | |
| 6,993,501 B1 | 1/2006 | Zhao | |
| 7,003,495 B1 | 2/2006 | Burger et al. | |
| 7,012,504 B2 | 3/2006 | Tuttle | |
| 7,016,879 B2 | 3/2006 | Harada | |
| 7,020,680 B2 | 3/2006 | Defosse | |
| 7,027,808 B2 | 4/2006 | Wesby | |
| 7,031,804 B2 | 4/2006 | Brooke, Jr. et al. | |
| 7,051,924 B2 | 5/2006 | Nakano et al. | |
| 7,054,845 B2 | 5/2006 | Oshima et al. | |
| 7,063,251 B2 | 6/2006 | Namekawa et al. | |
| 7,069,251 B1 | 6/2006 | Bartz et al. | |
| 7,070,112 B2 | 7/2006 | Beenau et al. | |
| 7,076,328 B2 | 7/2006 | Piikivi | |
| 7,076,329 B1 | 7/2006 | Kolls | |
| 7,079,832 B2 | 7/2006 | Zalewski et al. | |
| 7,085,556 B2 | 8/2006 | Offer | |
| 7,097,108 B2 | 8/2006 | Zellner et al. | |
| 7,098,770 B2 | 8/2006 | Charrat et al. | |
| 7,100,835 B2 | 9/2006 | Selker | |
| 7,104,458 B2 | 9/2006 | Schmuck et al. | |
| 7,108,180 B2 | 9/2006 | Brusso et al. | |
| 7,110,792 B2 | 9/2006 | Rosenberg | |
| 7,117,012 B1 | 10/2006 | Kolbeck et al. | |
| 7,119,659 B2 | 10/2006 | Bonalle et al. | |
| 7,124,955 B2 | 10/2006 | Lasch et al. | |
| 7,127,236 B2 | 10/2006 | Khan et al. | |
| 7,131,575 B1 | 11/2006 | Kolls | |
| 7,133,659 B2 | 11/2006 | Zalewski et al. | |
| 7,146,344 B2 | 12/2006 | Wankmueller | |
| 7,147,149 B2 | 12/2006 | Giraldin et al. | |
| 7,147,151 B2 | 12/2006 | Lasch et al. | |
| 7,155,199 B2 | 12/2006 | Zalewski et al. | |
| 7,156,301 B1 | 1/2007 | Bonalle et al. | |
| 7,164,884 B2 | 1/2007 | Defosse et al. | |
| 7,167,892 B2 | 1/2007 | Defosse et al. | |
| 7,194,422 B1 | 3/2007 | St. John Killick | |
| 7,325,728 B2 | 2/2008 | Arora et al. | |
| 7,353,208 B1 | 4/2008 | Stambaugh | |
| 7,428,987 B2 | 9/2008 | Ota et al. | |
| 7,448,540 B2 | 11/2008 | Nakajima | |
| 7,455,223 B1 | 11/2008 | Wilson et al. | |
| 7,457,782 B2 | 11/2008 | Nakajima | |
| 7,464,867 B1 | 12/2008 | Kolls | |
| 7,551,814 B1 | 6/2009 | Smits | |
| 7,577,496 B2 | 8/2009 | Walker et al. | |
| 2002/0002534 A1* | 1/2002 | Davis et al. | 705/39 |
| 2002/0004783 A1 | 1/2002 | Paltenghe et al. | |
| 2002/0077889 A1 | 6/2002 | Kolls | |
| 2002/0123926 A1* | 9/2002 | Bushold et al. | 705/14 |
| 2002/0143626 A1* | 10/2002 | Voltmer et al. | 705/14 |
| 2002/0156727 A1 | 10/2002 | LeVake et al. | |
| 2002/0188509 A1* | 12/2002 | Ariff et al. | 705/14 |
| 2002/0188511 A1 | 12/2002 | Johnson et al. | |
| 2003/0025080 A1 | 2/2003 | Sting et al. | |
| 2003/0032474 A1 | 2/2003 | Kaminkow | |
| 2003/0033211 A1* | 2/2003 | Haines et al. | 705/26 |
| 2003/0065569 A1 | 4/2003 | Danis et al. | |
| 2003/0094931 A1 | 5/2003 | Renyolds | |
| 2003/0191709 A1 | 10/2003 | Elston et al. | |
| 2003/0200144 A1* | 10/2003 | Antonucci et al. | 705/14 |
| 2003/0216964 A1* | 11/2003 | MacLean et al. | 705/14 |
| 2004/0073497 A1 | 4/2004 | Hayes et al. | |
| 2004/0129778 A1 | 7/2004 | Ota et al. | |
| 2004/0139002 A1 | 7/2004 | Henn et al. | |
| 2004/0148224 A1 | 7/2004 | Gauthier et al. | |
| 2004/0201573 A1 | 10/2004 | Yu et al. | |
| 2004/0243468 A1* | 12/2004 | Cohagan et al. | 705/14 |
| 2005/0015410 A1* | 1/2005 | Sato | 707/200 |
| 2005/0021400 A1 | 1/2005 | Postrel | |
| 2005/0027601 A1* | 2/2005 | Walker et al. | 705/15 |
| 2005/0098575 A1* | 5/2005 | Carhuff et al. | 221/150 R |
| 2005/0131577 A1 | 6/2005 | Ota et al. | |
| 2005/0131792 A1 | 6/2005 | Rowe | |
| 2005/0161079 A1 | 7/2005 | Gray | |
| 2005/0187870 A1 | 8/2005 | Grear et al. | |
| 2005/0192897 A1* | 9/2005 | Rogers et al. | 705/40 |
| 2005/0205609 A1 | 9/2005 | Ward et al. | |
| 2005/0216404 A1 | 9/2005 | Sims et al. | |
| 2005/0228719 A1 | 10/2005 | Roberts et al. | |
| 2005/0234778 A1 | 10/2005 | Sperduti et al. | |
| 2006/0031428 A1* | 2/2006 | Wikman | 709/220 |
| 2006/0074755 A1* | 4/2006 | Juetten et al. | 705/14 |
| 2006/0111978 A1* | 5/2006 | Tietzen et al. | 705/14 |
| 2006/0149671 A1 | 7/2006 | Nix et al. | |
| 2006/0158138 A1 | 7/2006 | Walter et al. | |
| 2006/0167967 A1 | 7/2006 | Defosse | |
| 2006/0180647 A1 | 8/2006 | Hansen | |
| 2006/0190128 A1 | 8/2006 | Brooke, Jr. et al. | |
| 2006/0202035 A1 | 9/2006 | Challa et al. | |
| 2006/0219517 A1 | 10/2006 | Cheng et al. | |
| 2006/0219776 A1* | 10/2006 | Finn | 235/380 |
| 2006/0223505 A1 | 10/2006 | Starr et al. | |
| 2006/0224696 A1* | 10/2006 | King et al. | 709/218 |
| 2007/0014916 A1 | 1/2007 | Daniels | |
| 2007/0050465 A1 | 3/2007 | Canter et al. | |
| 2007/0072548 A1 | 3/2007 | Godwin et al. | |
| 2007/0083287 A1 | 4/2007 | Defosse et al. | |
| 2007/0124204 A1* | 5/2007 | de Boer et al. | 705/14 |
| 2007/0136125 A1 | 6/2007 | Godwin et al. | |

| | | |
|---|---|---|
| 2007/0138262 A1 | 6/2007 | Lai |
| 2007/0138265 A1 | 6/2007 | Powell et al. |
| 2007/0187491 A1 | 8/2007 | Godwin et al. |
| 2007/0276763 A1* | 11/2007 | Kleinman et al. ............ 705/64 |
| 2007/0299555 A1 | 12/2007 | Walker et al. |
| 2008/0051193 A1 | 2/2008 | Kaminkow et al. |
| 2008/0126261 A1 | 5/2008 | Lovett |
| 2008/0133351 A1* | 6/2008 | White et al. .................. 705/14 |
| 2008/0167966 A1 | 7/2008 | Ramsdale et al. |
| 2008/0235091 A1 | 9/2008 | Holliday |
| 2009/0013028 A1 | 1/2009 | Canter et al. |
| 2009/0055281 A1 | 2/2009 | DeMedio et al. |

FOREIGN PATENT DOCUMENTS

| | | |
|---|---|---|
| WO | 00/31701 A1 | 6/2000 |

OTHER PUBLICATIONS

El-Far, Ibrahim K. and Whittaker, James as NPL article: "Model-Based Software Testing", published on Jan. 15, 2002.*

Wile, David S.'s NPL article: "Programming Languages", published on Jan. 15, 2002.*

I.C.P. Working Group, Title: Multi-Drop Bus/Internal Commmunication Protocol, Version 1.0, National Automatic Merchandising Association, date: Oct. 14, 1998, pp. 1-117.

Daniel Palmer, Title: Coca-Cola Amatil Trials Cashless Vending Machines, Source-VMSL, Date: Jul. 31, 2008, pp. 1-3.

Tanger-Riverhead, Title: Credit Card Test and Operational Procedures, Date: Jun. 8, 2006, pp. 1- 14.

Vending Management Services, Ltd., Title: Cashless Vending System—Settlement Engine Technical Specification, Dates: 2006, pp. 1-68.

The Coca-Cola Company, Title: Global Vending Network Cashless Vending Settlement Engine Requirements, Date: Sep. 12, 2006, Version No. 1.1, pp. 1-40.

Kasavana, Michael L., Title: Nama White Paper: Cashless Vending, Date: Unknown, pp. 1-40.

Swinder Grewal, Toll Roads and Contactless Multiapplication Smart Cards, South African Transport Conference, Action in Transport for the New Millennium Conference Papers, Jul. 17-20, 2000, pp. 1-6, Document Transformation Technologies, South Africa.

Non-Final Office Action and Notice of References cited in U.S. Appl. No. 12/041,035, mailed on Feb. 1, 2011.

Final Office Action and Notice of References cited in U.S. Appl. No. 12/041,036, mailed on Feb. 2, 2011.

Final Office Action and Notice of References cited in U.S. Appl. No. 12/041,039, mailed on Jan. 18, 2011.

ifoApple Store; Retail Store Hiring:1212412005 At 222.ifoapplestore.comlstoreslhiring.html, 9 pages.

www.staples.com; How do I redeem my coupons? at www.staples.comlsbdlcontent/help you; 2 pages; 2006.

Forum; at forums.anandtech.comlarchivelindex.phplt-496029.html; 0311512001, 3 pages.

* cited by examiner

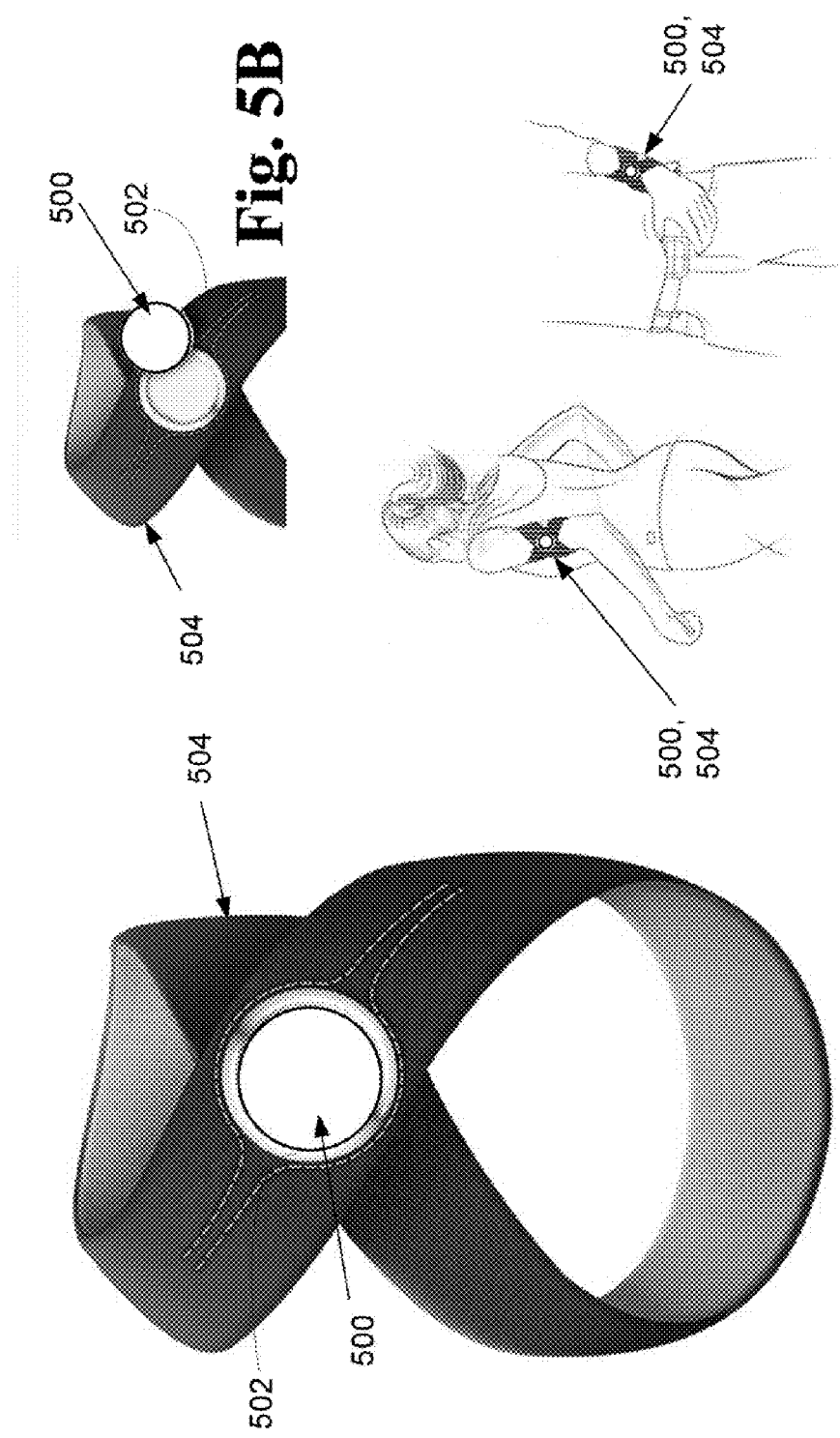

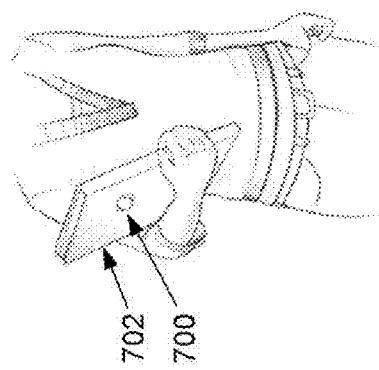
Fig. 7
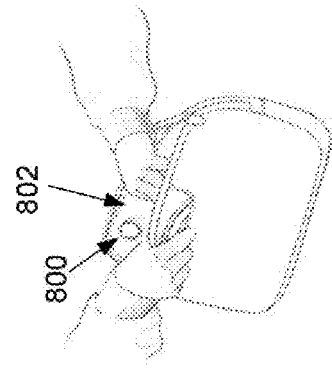
Fig. 8
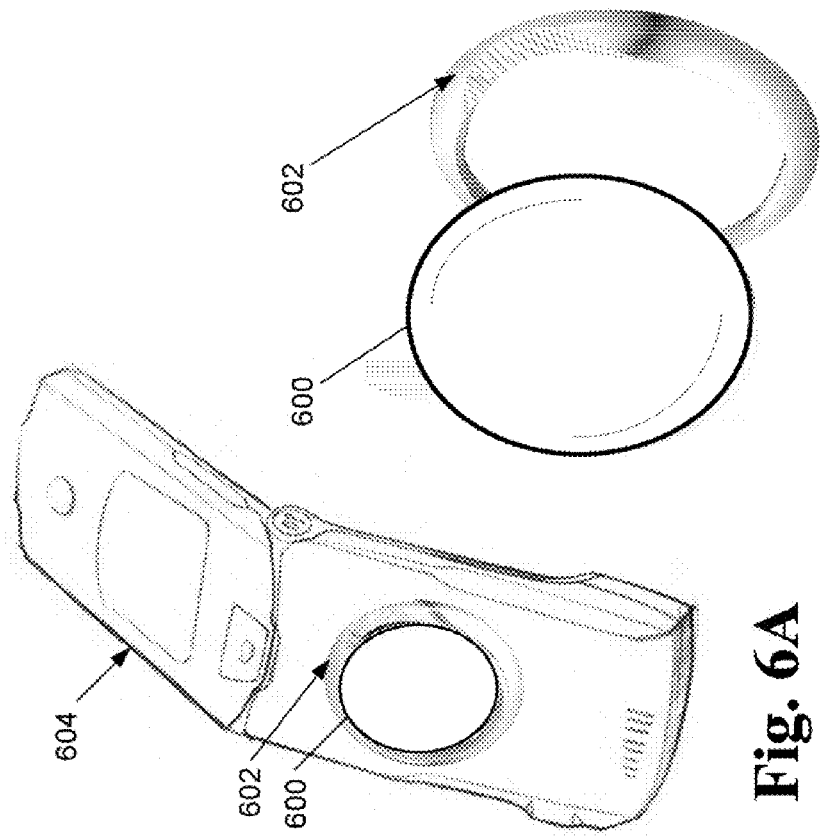
Fig. 6B
Fig. 6A

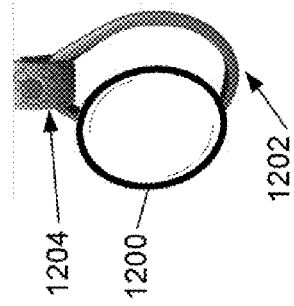
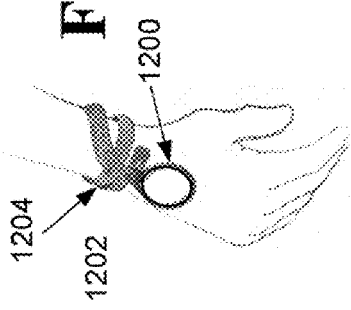
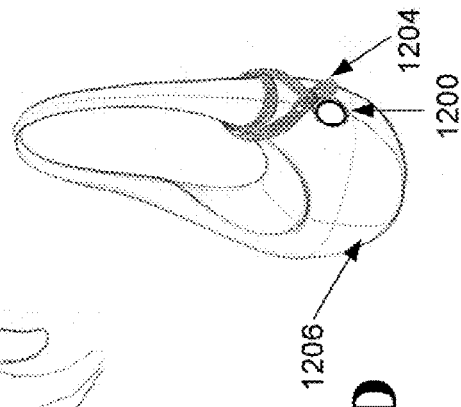
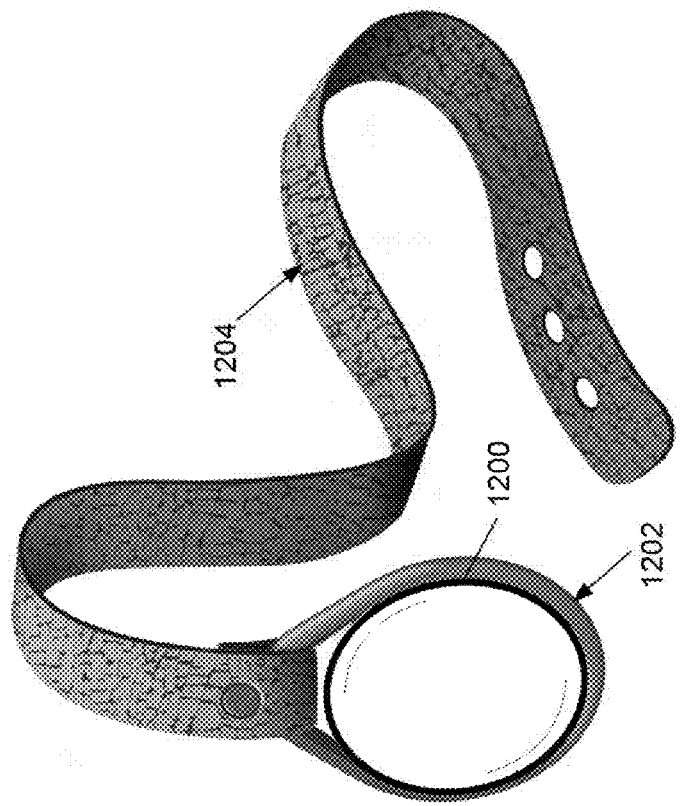

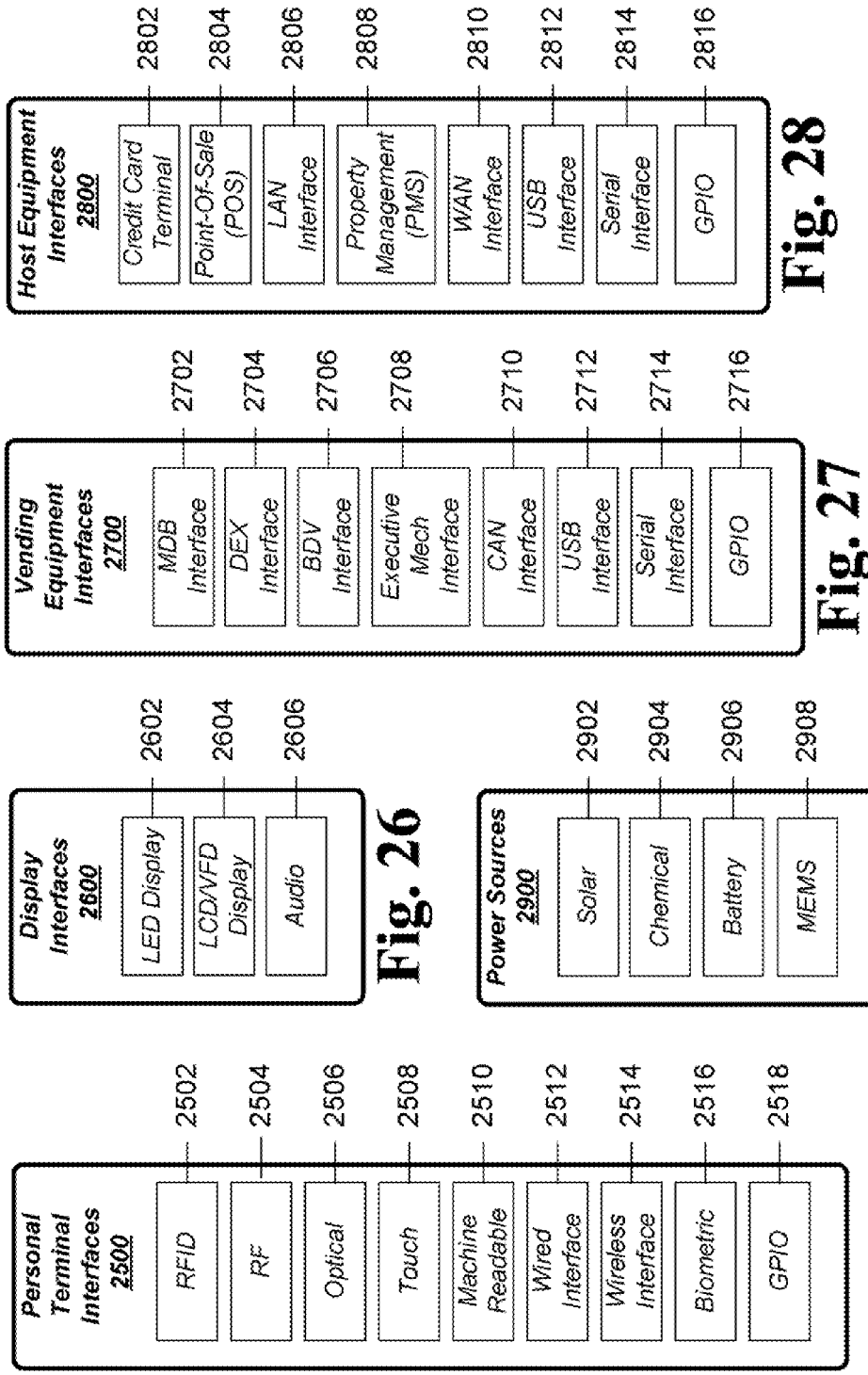

SYSTEMS FOR IMPLEMENTING A LOYALTY PROGRAM

TECHNICAL FIELD OF THE INVENTION

This application generally relates to incentive programs, and more particularly relates to systems and methods for implementing a loyalty program.

BACKGROUND OF THE INVENTION

The immediate consumption channel in the food and beverage industry typically includes food and beverages from vending equipment such as vending machines, or host equipment such as fountain machines and coolers. In general, food and beverages that are immediately available to a consumer and are ready to eat or drink can be considered part of the immediate consumption channel.

Broadly marketing to the immediate consumption channel can be challenging. The immediate consumption channel is fragmented by a plethora of equipment manufacturers, equipment owners and operators, and equipment makes and models having varied internal electrical and software configurations. Therefore, implementing new marketing opportunities can be high risk. Extensive engineering efforts may be required to address both newer equipment and older equipment that may not conform with industry standards. Operators may require new technology to work on all makes and models of equipment, but because non-industry-standard equipment may not support new technology, the introduction of the new technology may be stalled or may fail completely.

Engineering technology that addresses the entire existing base of equipment at a cost that enables new technology to be adopted across the industry may be difficult. Within the existing base of equipment, less than half of existing vending machines support current industry standards, and within the subset that do, many of these machines may not be located in places that generate sufficient revenue to justify equipping the machines with, for example, electronics aimed at driving more sales.

Further, vending and host equipment platforms can vary widely. For example, vending machines may be unattended, with the consumer selecting and paying for the product directly at the machine. Coolers may be accessible to the consumer in an attended environment, with the consumer selecting the product from the cooler and paying for the product at, for example, a cash register. Fountain equipment may be operated by an attendant or may be self-serve and may typically require the consumer to pay for the beverage separately. Though all examples of equipment in the immediate consumption channel, the diverse nature of the equipment and the diverse nature of the consumer's interaction with the equipment can complicate the implementation of broad marketing opportunities directed at the immediate consumption channel as a whole.

Consumer confidence may be affected by money acceptance issues and the absence of loyalty and other types of rewards. These and other issues may negatively impact the consumer's experience, and therefore the consumer's loyalty at the equipment. Alternatives to currency, such as cashless payment alternatives, have been introduced in the industry. However, the cost of associated cashless terminal hardware, the limited pool of compatible equipment, and recurring fees and transaction costs associated with processing cashless payments may stall the adoption of such technology.

Consumers and operators may want an interaction experience that is available on all platforms of vending and host equipment. Operators may want to provide the consumer with an experience that breeds consumer loyalty, and consumers may want to be rewarded for their loyalty. Additionally, both operators and consumers may want cashless payment options at the equipment. Operators may also want to create marketing campaigns directed at the immediate consumption channel that can drive immediate consumption sales. Therefore, a need exists in the industry for the systems and methods to address these drawbacks.

A further need exists for systems and methods for implementing a loyalty program.

SUMMARY OF THE INVENTION

A system for implementing a loyalty program includes a personal terminal, an interaction terminal, and a loyalty module. The personal terminal may be associated with a user. The interaction terminal may be associated with a product or service. The interaction terminal and the personal terminal may be operable to establish a communication when in proximity of each other. The loyalty module may be operable to provide a benefit to the user in response to the communication. The benefit may be provided without regard to whether the user purchased the product or service.

The personal terminal may comprise an RFID reader and the interaction terminal may comprise an RFID tag. The personal terminal may communicate with the interaction terminal using infrared signals. The product may be a beverage. The benefit may include at least one of the following: a loyalty point, a monetary value, and a credit toward at least a portion of a product or a service.

The personal terminal and the interaction terminal may be operable to communicate with each other when the user brings the personal terminal within proximity of the interaction terminal.

The system may also include a loyalty server. The loyalty server may include an account associated with the user. The loyalty module may be operable to store an indication of the benefit in the account of the user. The loyalty server may further include a user interface. The user interface may be operable to receive an instruction to redeem the benefit from the user. The personal terminal may be operable to communicate with the loyalty server over a network.

The loyalty module may be further operable to vary the benefit based on a pre-defined criteria. The pre-defined criteria may be at least one of the following: time, location, product, brand, frequency, quantity, or price.

In embodiments, a system for implementing a loyalty program may include a personal terminal, an interaction terminal, and a loyalty module. The personal terminal may be associated with a user. The interaction terminal may be associated with a product device operable to provide a product or service. The interaction terminal and the personal terminal may be operable to establish a communication when in proximity of each other. The loyalty module may be operable to provide a benefit to the user in response to the communication. The benefit may be provided without regard to whether the product device facilitated access to the product or service.

The product device may include one of the following: a vending machine, a product dispenser, a fountain machine, or a cooler. The loyalty module may be further operable to authorize a transaction at the product device.

In embodiments, a system for implementing a loyalty program may include a personal terminal, an interaction terminal, and a loyalty module. The personal terminal may be associated with a user. The interaction terminal may be associated with a transaction device. The transaction device may be operable to receive payment for a product or service. The interaction terminal and the personal terminal may be operable to establish a communication when in proximity of each other. The loyalty module may be operable to provide a benefit to the user in response to the communication. The benefit may be provided without regard to whether the transaction device received payment for the product or service.

The transaction device may include one of the following: a vending machine, cash register, a credit card machine, a debit card machine, a cash acceptance device, a cash transaction device, a cashless transaction device, an automatic teller machine, a point-of-sale terminal, a computer system, a website, or a property management system. The loyalty module may be further operable to transmit a payment instruction to the transaction device. The payment instruction may include at least one of the following: a debit from an accrued loyalty reward balance, a debit from a pre-paid cash balance, a credit card number, or a debit card number.

In embodiments, a system may include a first interaction terminal, a second interaction terminal, a personal terminal, and a loyalty module. The first interaction terminal may be mounted to a first vending machine. The second interaction terminal may be operationally integrated with a second vending machine. The personal terminal may be provided to a user. The personal terminal and the first interaction terminal may establish a first communication when in proximity of each other. The personal terminal and the second interaction terminal may establish a second communication when in proximity of each other. The loyalty module may be operable to provide a benefit to the user in response to the first communication or the second communication.

The loyalty module may be further operable to transmit a payment instruction to the second vending machine via the second interaction terminal.

The system may further include a loyalty server. The loyalty server may include an account associated with the user. The loyalty module may be further operable to store an indication of the benefit in the account of the user. The loyalty server may further include a user interface. The user interface may be operable to receive an instruction to redeem the benefit from the user.

BRIEF DESCRIPTION OF THE FIGURES

The present disclosure may be better understood with reference to the following figures. Matching reference numerals designate corresponding parts throughout the figures, and components in the figures are not necessarily to scale.

FIGS. 3-12 illustrate embodiments of a personal terminal used in various applications in accordance with various embodiments of the invention.

FIG. 25 illustrates a block diagram of an embodiment of a personal terminal interface of the interaction terminal in accordance with an embodiment of the invention.

FIG. 26 illustrates a block diagram of an embodiment of a display interface of the interaction terminal in accordance with an embodiment of the invention.

FIG. 27 illustrates a block diagram of an embodiment of a vending equipment interface of the interaction terminal in accordance with an embodiment of the invention.

FIG. 28 illustrates a block diagram of an embodiment of a host equipment interface of the interaction terminal in accordance with an embodiment of the invention.

FIG. 29 illustrates a block diagram of a power source of the interaction terminal in accordance with an embodiment of the invention.

DETAILED DESCRIPTION OF EMBODIMENTS OF THE INVENTION

Figure 1:
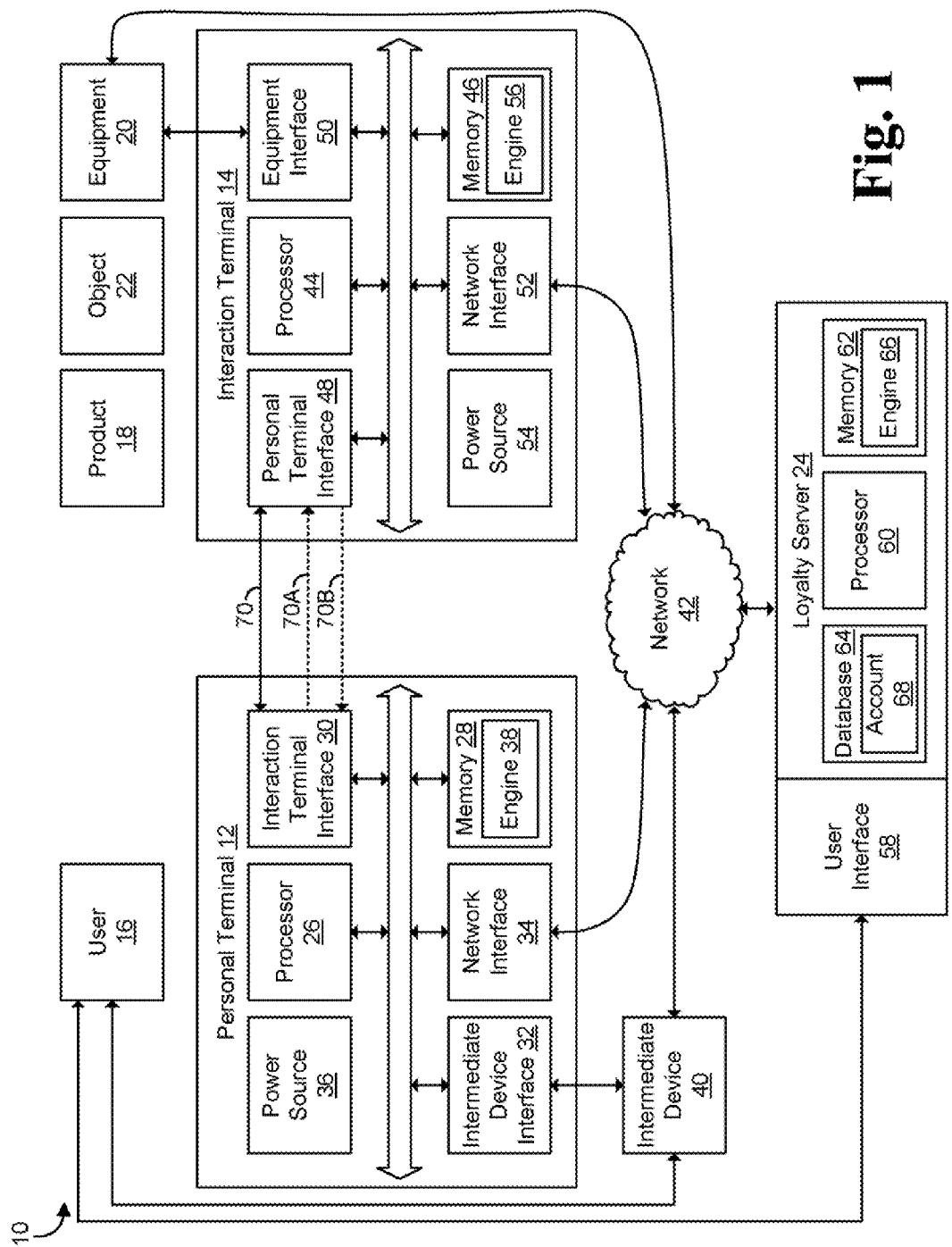
FIG. 1 is a block diagram illustrating an embodiment of a system for implementing a loyalty network.

Described below are embodiments of systems and methods for implementing a loyalty program, such as system 10 shown in FIG. 1. Embodiments of a system can reward a user for interacting with a product, service, brand, or entity, and may reward the user without receiving a payment. For example, an embodiment of the system may encourage loyalty to a particular product by rewarding a user for interacting with the product, equipment that provides the product or accepts payment for the product, or objects promoting the product, such as advertisements and displays. Such embodiments may reward the user regardless of whether the user actually obtains or purchases the product. Furthermore, an embodiment of the system may encourage loyalty to a particular brand, company, or other entity, by rewarding a user for interacting with products or equipment associated with the brand, company, or entity, or with objects promoting the brand, company, or entity. Such a system may reward the user regardless of whether the user actually obtains or purchases products or services associated with the brand, company, or entity.

Embodiments of a system, such as 10, also known as a loyalty program management system, may include at least one personal terminal, such as 12, and at least one interaction terminal, such as 14. The personal terminal may be associated with a user, such as 16, and the interaction terminal may be associated with a product, such as 18, a piece of equipment, such as 20, or with a promotional object, such as 22. When an interaction occurs between the user 16 and the product 18, equipment 20, or promotional object 22, the personal terminal 12 and the interaction terminal 14 may communicate with each other. In embodiments, for example, the personal terminal 12 and the interaction terminal 14 may communicate via radio-frequency signals or infrared signals, although other configurations are possible as described below. A benefit may be provided to the user 16, such as a loyalty point that rewards the user 16 for interacting with the product 18 or the equipment 20. The user 16 may redeem the benefit at the equipment 20, or through a loyalty server, such as 24, among others.

More specifically, the personal terminal 12 may be sized and shaped to be transported by or with the user 16. Thus, the personal terminal 12 may be accessible when the user 16 is in proximity of the product 18, equipment 20, or promotional object 22. In some embodiments, the personal terminal 12 may be a fob-type device as described below with reference to FIGS. 2-14. The fob-type device may be carried by the user 16 or may be coupled to an article associated with the user 16, such as clothing, a key chain, a wireless phone, an identification badge or any other device, card, pass, or badge associated with the user.

The interaction terminal 14 may be associated with the product 18, such as disposable packaging of a product. For example, the product 18 may be a beverage. The terms "product", "good", and "beverage" may be used interchangeably throughout this disclosure. The interaction terminal 14 may also be associated with or operationally integrated with equipment 20. For example, in some cases the interaction terminal 14 may be a tag, such as an RFID tag or an IR tag, that is affixed or mounted to the equipment. In other cases, the interaction terminal 14 may be integrated with the equipment such that the interaction terminal 14 and the equipment 20 can communicate with each other via, for example, radio-frequency or infrared signals. The equipment 20 may be any device that provides a product. For example, the product may be a beverage, and the equipment 20 may be product device such as a vending machine, a dispenser, a cooler, or a fountain machine, as described below. The equipment 20 may also be any device that accepts payment for a product. For example, the equipment 20 may be a transaction device such as a vending machine, a cash register, a credit card machine, a debit card machine, a cash acceptance device, a cash transaction device, a cashless transaction device, an automatic teller machine, a point-of-sale terminal, a website, or a property management system, as described below. The interaction terminal 14 may also be associated with a promotional object 22. The promotional object 22 may be associated with a particular good or service, brand, company, or other entity. Examples of promotional objects 22 include, for example, a poster, an advertisement, a kiosk, or a display.

When an interaction occurs between the user 16 and the product 18, equipment 20, or promotional object 22, the personal terminal 12 and the interaction terminal 14 may communicate with each other. In some embodiments, the interaction terminal 14 may be mounted to, for example, an exterior of the product 18, so the personal terminal 12 and the interaction terminal 14 may communicate when the user 16 is in proximity of the product 18. The interaction terminal 14 may also be mounted to, for example, an interior of the product 18, so that the personal terminal 12 and the interaction terminal 14 may communicate when the product 18 is opened. For example, the product 18 may be a bottle, and the interaction terminal 14 may be mounted to an interior of a lid of the bottle. Thus, the system 10 may be adapted to provide a benefit to the user 16 for interacting with the product 18, without regard to whether the user 16 has paid for the product 18.

In other embodiments, the interaction terminal 14 may be associated with or otherwise mounted to equipment 20 configured for providing a product, so that the personal terminal 12 and the interaction terminal 14 may communicate with each other when the user 16 is in proximity to receive the product from the equipment 20. For example, the interaction terminal 14 may be associated with or otherwise mounted to a vending machine, a product dispenser, a fountain machine, or a cooler, among others. For the purposes of this disclosure, these pieces of equipment 20 may also be referred to as dispensing devices. The interaction terminal 14 may also be operationally integrated with such equipment 20, so that the personal terminal 12 and equipment 20 may communicate via the interaction terminal 14. For example, the equipment 20 may indicate to the personal terminal 12 that the product has been provided to the user 16. Thus, the system 10 may be adapted to provide the user 16 with a benefit for receiving the product, and the system 10 may withhold providing the benefit until after the product is actually provided. As another example, the personal terminal 12 may indicate to the equipment 20 that the user 16 is not authorized to receive a particular product or to receive a product at a particular time of day. Thus, the system 10 may be adapted to prevent or otherwise limit the equipment 20 from providing the product based at least in part on certain rules stored on or transmitted through the personal terminal 12.

In still other embodiments, the interaction terminal 14 may be mounted to or otherwise associated with equipment 20 that accepts payment a product, so that the personal terminal 12 and the interaction terminal 14 may communicate when the user 16 is in proximity to purchase the product. For example, the interaction terminal 14 may be mounted on a vending machine, a cash register, a credit card machine, a debit card machine, a cash acceptance device, a cash transaction device, a cashless transaction device, an automatic teller machine, a point-of-sale terminal, a computer system, a website, or a property management system. among others. For the purposes of this disclosure, these pieces of equipment 20 may also be referred to as transaction devices. The interaction terminal 14 may also be operationally integrated with such equipment 20, so that the personal terminal 12 and the equipment 20 may communicate through the interaction terminal 14. For example, the equipment 20 may indicate to the personal terminal 12 that payment has been received. Thus, the system 10 may be adapted to provide the user 16 with the benefit for purchasing the product, and the system 10 may withhold providing the benefit to the user 16 until after the payment has been received. As another example, the personal terminal 12 may transmit an indication of payment to the equipment 20. Thus, the system 10 may be adapted to permit the user 16 to perform cashless transactions, as described below.

In fact, the interaction terminal 14 may be associated with or otherwise mounted to a promotional object 22. For example, the interaction terminal 14 may be mounted to any object 22 associated with a particular product, service, brand, or entity, in which case the personal terminal 12 and the interaction terminal 14 may communicate when the user 16 interacts with the product, service, brand, or entity. Thus, the system 10 may be adapted to provide the benefit to the user 16 for interacting with the product, service, brand, or entity, regardless of whether the user 16 obtains or purchases the product or service, or a product or service associated with the brand or entity.

The personal terminal 12 may include one or more of a processor 26, a memory 28, an interaction terminal interface 30, an intermediate device interface 32, a network interface 34, and a power source 36. The memory 28 may store a loyalty management engine or module 38, such as a set of instructions that can be executed by the processor 26. An example set of instructions can be a set of computer-executable instructions such as a loyalty management module or engine stored on a computer-readable medium. The interaction terminal interface 30 may permit communication between the personal terminal 12 and the interaction terminal 14. The intermediate device interface 32 may permit communication between the personal terminal 12 and one or more intermediate devices 40, such as a personal computer or a cellular phone, among others. Such intermediate devices 40 may be in communication with a network 42, and therefore the personal terminal 12 may communicate with the network 42 through the intermediate device 40. Further, the network interface 34 may permit communication between the personal terminal 12 and a network 42 without the use of the intermediate device 40. The power source 36 may power one or more components of the personal terminal 12. The power source 36 may be, for example, a rechargeable battery such as a solar battery, among others. Each of these components is described in greater detail below.

Similarly, the interaction terminal 14 may include one or more of a processor 44, a memory 46, a personal terminal interface 48, an equipment interface 50, a network interface 52, and a power source 54. The memory 46 may store a loyalty management engine or module 56, or a set of instructions, that can be executed by the processor 44. An example set of instructions can be a set of computer-executable instructions such as a loyalty management engine or module stored on a computer-readable medium. The personal terminal interface 48 may permit communication between the interaction terminal 14 and the personal terminal 12. The equipment interface 50 may permit communication between the interaction terminal 12 and the equipment 20, such as a vending machine or a credit-card terminal, among others. The network interface 52 may permit communication with the network 42. The power source 54 may power one or more components of the interaction terminal 14. Each of these components is described in greater detail below.

It should be understood that the components of the terminals 12, 14 described above are functional components, and in constructing the terminals 12, 14 any suitable physical configuration can be used. Further, one or more of the functional components may be omitted from the personal terminal 12 or the interaction terminal 14 in accordance with an embodiment of the invention. For example, in embodiments in which the personal terminal 12 is an RFID reader, the personal terminal 12 may include a microcontroller that includes the processor 26 and the memory 28, and the interaction terminal interface 30 may include an antenna adapted for sending and receiving radio-frequency signals. Similarly, the interaction terminal 14 may include a microcontroller that includes the processor 44 and the memory 46, and the personal terminal interface 48 may include an antenna adapted for sending and receiving radio-frequency signals.

The system 10 may also include a loyalty server 24. An example loyalty server 24 may include a user interface 58, a processor 60, a memory 62, and a database 64. The memory 62 may store a loyalty management engine or module 66, or a set of instructions, that can be executed by the processor 60. An example set of instructions can be a set of computer-executable instructions such as a loyalty management module or engine stored on a computer-readable medium. The database 64 may include an account 68 associated with the user 16. The account 68 may store information such as information identifying the user 16, a balance of the benefits, such as loyalty points, accrued by the user 16, a credit-card number of the user 16, a debit card number of the user 16, or a pre-paid cash balance supplied by the user 16, among others. The loyalty server 24 also may communicate with the network 42, and one or more of the personal terminal 12 and/or the interaction terminal 14. The equipment 20 may communicate with the loyalty server 24 over a network 42. The user 16 also may communicate with the loyalty server 24 through the user interface 58. For example, the user interface 58 may be a website that is available to the user 16 over the Internet or other network, although other configurations are possible. The user interface 58 may permit the user 16 to enter information into the loyalty server 24, to update information associated with the account 68, or to check the balance of benefits in the account 68, among others. The user interface 58 also may permit the user 16 to redeem the benefits, as described in further detail below. However, the loyalty server 24 may be omitted in some embodiments. In such embodiments, the personal terminal 12 may not be able to communicate with the network 42, and the intermediate device interface 32 and the network interface 34 may be omitted. The interaction terminal 14 also may not be able to communicate with the network 42, and the network interface 52 of the interaction terminal 14 may be omitted.

The personal terminal 12 and the interaction terminal 14 may communicate via, for example, one or more signals 70. The signals 70 may be radio-frequency signals, infrared signals, optical signals, or any other electromagnetic, magnetic, or other signals. In some embodiments, the signals 70 may be transmitted between the interfaces 30, 48 when the terminals 12, 14 are in proximity of each other. (In such embodiments, the terminals 12, 14 may not contact each other.) In some embodiments, the signals 70 may be transmitted between the interfaces 30, 48 when the terminals 12, 14 engage or otherwise physically interact with each other.

For example, the personal terminal 12 may include a transponder-interrogator, and the interaction terminal 14 may include a transponder. In such cases, the interaction terminal interface 30 of the personal terminal 12 may be a transmitter/receiver, and the personal terminal interface 48 of the interaction terminal 14 may be a receiver/transmitter. When the user 16 is, for example, in proximity of the product 18, equipment 20, or promotional object 22, the personal terminal 12 may transmit an interrogating signal 70A to the interaction terminal 14, and the interaction terminal 14 may respond by transmitting a responsive signal 70B to the personal terminal 12. In some embodiments, the interrogating signal 70A may power the interaction terminal 14. The configuration may also be reversed, such that the interaction terminal 14 may include the transponder-interrogator, and the personal terminal 12 may include the transponder.

In cases in which the signals 70 are radio-frequency signals, the personal terminal 12 may include an RFID reader and the interaction terminal 14 may include an RFID tag. Also, other the configurations are possible. For example, the configuration may be reversed, meaning the interaction terminal 14 may be the RFID reader and the personal terminal 12 may be the RFID tag.

As another example, the terminals 12, 14, may communicate via optical signals. The personal terminal 12 may include an optical scanner, and the interaction terminal 14 may include, for example, a bar code, or any other optically encoded indicator. As a further example, the personal terminal 12 and the interaction terminal 14 may communicate using magnetic strip technology. The personal terminal 12 may include a magnetic strip reader and the interaction terminal 14 may include a magnetic strip. In these and in other cases, the processor 44, memory 46, and power source 54 of the interaction terminal 14 may be omitted. Further, such configurations may be reversed.

During or after communication between the personal terminal 12 and the interaction terminal 14, a benefit may be provided to the user 16 as a reward for interacting with the product 18, equipment 20, or promotional object 22. A benefit can include, but is not limited to, a loyalty point, a monetary value, a credit toward at least a portion of a product or service, or any combination of these, among others. The benefit may be the same for each interaction, or the benefit may vary based at least in part on how the user 16 interacted with the product 18, equipment 20, or promotional object 22. For example, in some cases the user 16 may receive a benefit for being in proximity of the product 18, equipment 20, or promotional object 22, while in other cases the user 16 may be required to purchase or obtain a product from the equipment 20.

The benefit may be redeemable. For example, the benefit may be redeemed at the equipment 20 or through the user interface 58 of the loyalty server 24. The equipment 20 or user interface 58 may accept one or more benefits in exchange for a product, a service, or a reduction in the price of a product or service, among others. In some cases, the benefit may be immediately redeemed, while in other cases the benefit may be stored for future redemption. The benefit may also be accrued with other benefits before redemption, in which case the benefit may be added to an accrued benefit balance.

In some embodiments, the system 10 may include a number of interaction terminals 14 having different configurations. Some or all of the interaction terminals 14 may be adapted to integrate or communicate with the equipment 20. These interaction terminals 14 may have an equipment interface 50, and in some cases, may be adapted to perform at least some processing. Thus, these interaction terminals 14 may be deployed with relatively newer or more sophisticated types of equipment, which may be suited for integrating or communicating with the interaction terminal 14. These interaction terminals 14 may also be deployed with equipment that is located in a relatively higher traffic area or on equipment that handles a relatively larger volume of products, as retrofitting such equipment may be cost effective despite the cost and complexity associated with manufacturing and deploying the interaction terminal 14.

Other interaction terminals 14 may not be adapted to integrate or communicate with any equipment, such as 20. These interaction terminals 14 may not have an equipment interface 50, and in some cases, may not be adapted to perform a substantial amount of processing. Such interaction terminals 14 may be relatively less expensive to manufacture and deploy, due to the decreased complexity. Thus, such interaction terminals 14 may be deployed on older or less sophisticated equipment, on equipment that is located in a relatively lower traffic area, or on equipment that handles a relatively low volume of products. Such interaction terminals 14 may also be mounted or associated with the equipment 20 to conform the equipment 20 to the system 10. Such interaction terminals 14 may also be mounted on or associated with the disposable packaging of a product 18, or with promotional objects 22 that may not be suited for integrating with the interaction terminal 14, such as advertising and promotional materials. An example of one suitable interaction terminal 14 may be an RFID tag.

When the interaction terminal 14 is operable to communicate with the equipment 20, the personal terminal 12 may be operable to obtain benefits, redeem benefits, and perform cashless transactions at the equipment 20. When the interaction terminal 14 is not operable to communicate with the equipment 20, but is instead merely associated with the equipment 20, the personal terminal 12 may be operable to obtain benefits, but may not be operable to redeem benefits or perform cashless transactions. Thus, the user 16 may be able to obtain benefits from a broad range of products 18, equipment 20, and promotional objects 22, and the user 16 may be able to redeem benefits or perform cashless transactions at equipment 20 that is integrated with an interaction terminal 14. Thus, the ability to obtain benefits may be broadly enabled, and in cases in which integrating the equipment 20 with the interaction terminal 14 is cost-effective, additional functionality such as the ability to redeem benefits and to perform cashless transactions may be enabled.

The system 10 may process the signals 70 to determine a benefit and to store the benefit. In some embodiments, the personal terminal 12 may process the interaction. The loyalty management engine or module 38 or set of instructions stored in the memory 28 of the personal terminal 12 may be configured to process the interaction, and the processor 26 of the personal terminal 12 may execute the loyalty management engine or module 38 to determine and store the benefit. In other embodiments, the loyalty server 24 may process the interaction. The loyalty management engine or module 66 stored in the memory 62 of the loyalty server 24 may be configured to process the interaction, and the processor 60 of the loyalty server 24 may execute the loyalty management engine or module to determine and store the benefit. In other embodiments, both the personal terminal 12 and the loyalty server 24 may be configured to process the interaction, and either one of the processors 26, 60 may execute the corresponding loyalty management engine or module 38, 66 to determine and store the benefit. Alternatively, the personal terminal 12 may be configured to process a portion of the interaction, and the loyalty server 24 may be configured to process a portion of the interaction. Both processors 26, 60, may execute the associated loyalty management engine or module 38, 66 to determine and store the benefit. For example, the personal terminal 12 may receive the signal 70 and store information about the transaction in the memory 38. Subsequently, the information may be uploaded to the loyalty server 24, where the loyalty management engine or module 66 may further process and filter the information to determine the benefit.

Below, the personal terminal 12 is described as being responsible for processing the interaction for the purpose of simplicity. However, a person of skill will understand that other components of the system may be responsible for such processing. For example, the loyalty management engine or module 56 stored in the memory 46 of the interaction terminal 14 may be configured to process at least a portion the interaction, and the processor 44 of the interaction terminal 14 may execute the loyalty management engine or module 56 as appropriate. The equipment 20 may also be adapted for at least some processing.

The loyalty management engine or module 38 may determine the same benefit for each interaction, or the loyalty management engine or module 38 may determine the benefit based at least in part on how the user 16 interacted with the product 18, equipment 20, or promotional object 22. In some embodiments, the personal terminal 12 and the interaction terminal 14 may be in proximity of each other when the user 16 is near the product 18, equipment 20, or promotional object 22, the signal 70 may be transmitted, and the loyalty management engine or module 38 may reward the user 16 accordingly. The loyalty management engine or module 38 may determine the benefit based on the mere transmission of the signal 70, so that the user 16 can be rewarded for being in such proximity alone. In such embodiments, the user 16 may obtain benefits, such as loyalty points, without regard to how or even whether a product was purchased or received.

For example, when the interaction terminal 14 is associated with or mounted to the product 18, the user 16 may receive the benefit for being near the product 18, regardless of whether the user 16 purchases or consumes the product 18. When the interaction terminal 14 is associated with or mounted to equipment 20, such as a vending machine, the user 16 may receive the benefit for being near the equipment regardless of whether the user 16 obtains or purchases a product from the equipment. When the interaction terminal 14 is mounted to a promotional object 22 associated with a particular product, service, brand, or entity, the user 16 may be rewarded for interacting with the product, service, brand, or entity, regardless of whether the user 16 purchases or obtains the product or service, or products or services associated with the brand or entity.

In other embodiments, the loyalty management engine or module 38 may reward the user 16 for being near a particular type of product 18, equipment 20, or promotional object 22. The signal 70 may indicate the information about the product 18, equipment 20, or promotional object 22 with which the interaction terminal 14 is associated, and the loyalty management engine or module 38 may set different benefits according to the information indicated by the signal 70. For example, the loyalty management engine or module 38 may be configured to set an increased benefit when the signal 70 indicates the user 16 interacted with a particular product 18, such as a new product. Such a system 10 may encourage the user 16 to try the product 18. As another example, the loyalty management engine or module 38 may be configured to set an increased benefit when the signal 70 indicates the user 16 interacted with equipment 20 configured to provide a product in exchange for payment, as opposed to equipment 20 configured to dispense a product for free. In such embodiments, the user 16 may accrue benefits at a slower rate, for example, from a free vending machine located in their workplace than from a public vending machine that accepts money.

In still other embodiments, the loyalty management engine or module 38 may reward the user 16 for receiving or purchasing a product from the equipment 20. In such embodiments, the interaction terminal 14 may include the equipment interface 50, which may be configured to communicate with the equipment 20. For example, in cases in which the equipment 20 is a vending machine, the equipment interface 50 may be configured to communicate with a multi-drop-bus (MDB) interface or a data exchange interface (DEX) of the vending machine, among others. In such cases, the signal 70 may indicate information provided to the interaction terminal 14 by the equipment 20 through the equipment interface 50. For example, the signal 70 may indicate the purchase price of a product dispensed by the equipment 20, and the loyalty management engine or module 38 may set different benefits according to the purchase price. The signal 70 also may indicate an identifier that uniquely identifies the equipment 20, among other information.

The loyalty management engine or module 38 also may vary or limit the benefit depending on the nature of the interaction of the user 16 with the product 18, equipment 20, or promotional object 22. For example, the loyalty management engine or module 38 may set a relatively more valuable benefit when the loyalty management engine or module 38 can confirm that the user 16 actually purchased or received a product from the equipment 20, and the loyalty management engine or module 38 may set a relatively less valuable benefit when the loyalty management engine or module 38 cannot confirm that the user 16 purchased or received a product from the equipment 20. The loyalty management engine or module 38 also may set the relatively less valuable benefit when the user interacts with the product 18 as opposed to the equipment 20 that provides the product or accepts payment for the product, as the product 18 may have already been received or purchased in such cases. The loyalty management engine or module 38 also may set the relatively less valuable benefit when the user 16 interacts with the promotional object 22, as purchase or receipt may or may not even be possible. In other words, the loyalty management engine or module 38 may reward the user 16 for merely interacting with products 18, promotional objects 22, and some types of equipment 20, while rewarding the user 16 for actually receiving or purchasing a product from other types of equipment 20. More specifically, when the equipment 20 can communicate through the interaction terminal 14 with the personal terminal 12, an indication may be transmitted from the equipment 20 to the personal terminal 12 indicating that the equipment 20 has provided a product or received payment. Thus, the personal terminal 12 may be aware that the equipment 20 has provided the product or received payment for the product, and the loyalty management engine or module 38 may set the benefit accordingly. However, when the interaction terminal 14 is not operable to permit communication between the personal terminal 12 and the equipment 20, the personal terminal 12 may not receive an indication that the equipment 20 has provided a product or received payment for a product, and the loyalty management engine or module 38 may set the benefit accordingly.

The loyalty management engine or module 38 also may vary or limit the benefit based on a pre-defined criteria. The pre-defined criteria may be one or more of time, location, product, brand, frequency, quantity, price. For example, the user 16 may work in an office environment having a fountain machine that dispenses beverages for free. The loyalty management engine or module 38 may limit the benefit that may be obtained by placing the personal terminal 12 in proximity of the fountain machine to, for example, one benefit per hour. As another example, the loyalty management engine or module 38 may limit the benefit that may be obtained by placing the personal terminal 12 in proximity of the product 18. For example, the user 16 may receive the benefit the first time the personal terminal 12 is placed in proximity of the product 18, but not thereafter. Thus, the user 16 may be prevented from receiving benefits for repeatedly interacting with the same product 18, equipment 20, or promotional object 22.

Once determined, the loyalty management engine or module 38 may store the benefit in one or more of the memory 28 of the personal terminal 12 and the database 64 of the loyalty server 24. The benefit may be temporarily stored in preparation for immediate redemption, or the benefit may be added to a balance of accrued benefits for future redemption. The balance of accrued benefits may indicate the benefits that have been accrued by the user 16 but have not been redeemed. In some cases, the balance of accrued benefits may be stored in the memory 28 of the personal terminal 12, so that the benefits are available for redemption when the personal terminal 12 interacts with the equipment 20 through the interaction terminal 14. In other cases, the balance of benefits may be stored in the database 64 of the loyalty server 24, such as in the account 68 of the user 16, so that the benefits are available for redemption from the loyalty server 24 through the user interface 58, as further described below. In still other cases, the balance of accrued benefits may be stored both on the personal terminal 12 and in the loyalty server 24, so that the user 16 may redeem the benefits at the equipment 20 using the personal terminal 12 or from the loyalty server 24 through the user interface 58.

So that the benefit becomes stored in the loyalty server 24, the loyalty management engine or module 38 may upload the benefit into the loyalty server 24 over the network 42. In some embodiments, the personal terminal 12 may be in connection with a network 42, such as a wireless or cellular network, in which case the benefit may be uploaded immediately. In other embodiments, the loyalty management engine or module 38 may store the benefit in the memory 28 of the personal terminal 12, and subsequently, the benefit may be uploaded into the loyalty server 24. For example, the personal terminal 12 may be connected to or may communicate with the intermediate device 40, such as a personal computer, and the intermediate device 40 may communicate with the network 42. It should be noted that the benefit may also be stored on the interaction terminal 14 and/or the equipment 20.

In some embodiments, the loyalty management engine or module 38 may be adapted to synchronize at least some of the information stored in the memory 28 of the personal terminal 12 and at least some of the information stored in the account 68 of the loyalty server 24. For example, the balance of benefits may be stored in both places, so that the user 16 may redeem the benefits at either the equipment 20 or through the user interface 58. Additionally, the pre-paid cash balance, the credit card number, and/or the debit card number may be entered into the loyalty server 24 and may be downloaded into the personal terminal 12 using the intermediate device 40 and/or the network 42. Thus, the pre-paid cash balance, the credit card number, and/or the debit card number user 16 may become stored on the personal terminal 12 so that the user 16 can use the personal terminal 12 to make cashless payments at the equipment 20, as described below.

The system 10 may also be adapted to receive an instruction to redeem the benefit. For example, the personal terminal 12 may receive the instruction to redeem the benefit. The user 16 may input the instruction into the personal terminal 12 directly. Alternatively, the user 16 may input the instruction into the equipment 20 and the instruction may be transmitted from the equipment 20 to the personal terminal 12. In response to the instruction of the user 16, the loyalty management engine or module 38 of the personal terminal 12 may access the memory 28 to determine whether the user 16 has the benefits required for completing the instruction. If so, the loyalty management engine or module 38 may debit the balance of accrued benefits and may transmit an instruction to the equipment 20. Thus, the equipment 20 may provide the user 16 with a product for free or at a reduced price. For example, the benefit may be a credit toward a portion of the price of a bottled beverage, and the equipment 20 may be a vending machine that accepts the credit to reduce the price of the bottled beverage. Thus, the instruction may cause the vending machine to dispense the bottled beverage for the reduced price. It should be noted that the order of the steps may be reversed in some cases. For example, the loyalty management engine or module 38 may send the instruction to the equipment 20 before the balance of accrued benefits is debited. Further, if the benefits are not stored locally, the loyalty management engine or module 38 may communicate with the loyalty server 24 over the network 42 to determine whether the user 16 has sufficient benefits and to debit the balance of accrued benefits in the account 68.

In other cases, the loyalty server 24 may receive the instruction to redeem the benefit. The user 16 may input the instruction into the user interface 58 of the loyalty server 24, which may be a website that is available to the user 16 over the internet. The user interface 58 may present products or services to the user 16, and may permit the user 16 to select one of the products or services in exchange for one or more benefits. In response to the selection of the user 16, the loyalty management engine or module 66 of the loyalty server 24 may access the balance of accrued benefits to determine whether the user 16 has the benefits required for completing the instruction. If so, the loyalty management engine or module 66 may debit the balance of accrued benefits and may generate an instruction to provide the product or service to the user 16. For example, the benefit may be a loyalty point that can be accrued with other loyalty points. The user interface 58 may offer a t-shirt in exchange for one hundred loyalty points and a guitar in exchange for one thousand loyalty points.

Once the user 16 has accrued one hundred loyalty points in his account 68, the user 16 may access the user interface 58 to redeem the loyalty points for the t-shirt.

It should be noted that the instruction to redeem the benefit may be a signal to any device capable of accepting at least a portion of the benefit as payment for a product or service. Such devices may include a vending machine, a cash register, a credit card machine, a debit card machine, a cash acceptance device, a cash transaction device, a cashless transaction device, an automatic teller machine, a point-of-sale terminal, a computer system, a website or a property management system. The signal may be, for example, an email, a phone call, a message, a wired or a wireless signal. For example, the user 16 may be able to redeem the loyalty points for products and services in a catalog.

The personal terminal 12 may be adapted to perform cashless transactions at the equipment 20. As mentioned above, the user 16 may associate a form of payment with his account 68, such as a credit card number, a debit card number, or a pre-paid cash balance. The form of payment may be maintained in the loyalty server 24, may be downloaded from the loyalty server 24 to the memory 28 of the personal terminal 12, or may be synchronized in both places. The personal terminal 12 may receive an instruction to transmit the form of payment to the equipment 20. For example, the user 16 may enter the instruction into the personal terminal 12, or the user 16 may enter the instruction into the equipment 20, and the instruction may be communicated from the equipment 20 to the personal terminal 12 through the interaction terminal 14. In response to the instruction of the user 16, the loyalty management engine or module 38 may perform at least some preliminary processing to determine whether the selected form of payment can be used. For example, the loyalty management engine or module 38 may ascertain whether the user 16 has sufficient funds in his pre-paid cash balance. If so, the loyalty management engine or module 38 may transmit an indication of payment from the personal terminal 12 to the equipment 20 through the interaction terminal 14, the indication of payment being one of the credit card number, the debit card number, or a debit from the pre-paid cash balance, as appropriate. Thus, the equipment 20 may receive the indication of payment, and the product may be provided to the user 16. For example, the equipment 20 may be a vending machine and the indication of payment may be a debit from the pre-paid cash balance. Upon receipt of the indication of payment, the equipment 20 may provide the selected product, such as a bottled beverage. As another example, the equipment 20 may be a credit card machine and the indication of payment may be the credit card number of the user 16. Upon receipt of the indication of payment, the equipment 20 may charge the product to the credit card.

In some embodiments, the form of payment may be a credit extended to the user 16. For example, the loyalty management engine or module 38 may determine that the user 16 cannot use the selected form of payment, such as in cases in which the user 16 has depleted his pre-paid cash balance. The loyalty management engine or module 38 may determine whether credit can be extended to the user 16. If so, the loyalty management engine or module 38 may transmit an indication of payment from the personal terminal 12 to the equipment 20, the indication of payment being the extended credit. Thus, the equipment 20 may receive the indication of payment, and the product may be provided to the user 16. The loyalty management engine or module 38 also may store the extended credit in the memory 28, so that the user 16 may be charged accordingly.

The personal terminal 12 may be adapted to authorize or limit transactions at the equipment 20. The user 16 may enter a selection at the equipment 20, and the equipment 20 may transmit the selection to the personal terminal 12 through the interaction terminal 14. The loyalty management engine or module 38 may determine whether the transaction is authorized, and the loyalty management engine or module 38 may transmit an appropriate instruction to the equipment 20 either allowing or denying the transaction. In response to the instruction, the equipment 20 may or may not allow the user 16 to purchase or obtain the product. Such a system 10 may be employed in, for example, a school. Faculty members and students may be provided with personal terminals 12. The personal terminals 12 provided to the faculty members may have a loyalty management engine or module 38 adapted to permit the faculty member to enter any transaction at the equipment 20 at any time, while the personal terminals 12 provided to the students may have a loyalty management engine or module 38 that limits the students. For example, the students may be prevented for obtaining or purchasing certain products at certain times of day.

The personal terminal 12 may be a gateway between the various components of the system 10. For example, the personal terminal 12 may permit communication between the interaction terminal 14 and the loyalty server 24. The interaction terminal 14 may have the loyalty management engine or module 56 that determines the benefit, and the benefit may be transmitted from the interaction terminal 14 to the personal terminal 12 for uploading into the loyalty server 24. Thus, the personal terminal 12 may be used to transmit benefits between various components of the system 10. In cases in which the interaction terminal 14 can communicate with the equipment 20, the personal terminal 12 may permit communication between the equipment 20 and the loyalty server 24. For example, the personal terminal 12 may be employed to update the software or firmware on the equipment 20. The loyalty server 24 may download such updates to the personal terminal 12, and the personal terminal 12 may transmit the updates to the equipment 20 through the interaction terminal 14. Alternatively, the system 10 may enable capturing data about the buying habits of the user 16. The equipment 20 may transmit information about the transaction through the interaction terminal 16 to the personal terminal 14. The information may indicate the type of product that was purchased or obtained from the equipment 20, the cost of the product, a unique identifier of the equipment 20, a unique identifier of the user 16, and any other desired information. For example, the equipment 20 may be a vending machine, and the information may be DEX data obtained by the DEX interface of the vending machine. The information may be uploaded from the equipment 20 through the interaction terminal 14 to the personal terminal 12, and from the personal terminal 12 to the loyalty server 24. The loyalty management engine or module 66 of the loyalty server 24 may analyze the information for trends or other relevant information. In some cases, the loyalty management engine or module 66 may also provide the user 16 with a benefit as a result of the analysis performed on the information.

It should be noted that other types of benefits may be provided by the system 10. For example, the benefit may be an obligation on behalf of the party providing the benefit to match a charitable contribution of the user 16. Additionally, the benefit may be determined, stored or redeemed in other manners. For example, the benefit may be stored on the interaction terminal 14, the equipment 20, or any other suitable device. In some embodiments, the benefit may also be transmitted between these components in any manner. For example, the interaction terminal 14 may be in communication with the network 42 and may upload the benefit into the loyalty server 24. In such an embodiment, the personal terminal 12 may communicate identifying information to the interaction terminal 14, such as a user identifier of the user 16 or an account identifier for the account 68.

Further, the benefit may be redeemed other than at the equipment 20 or through the user interface 58. For example, the benefit may be redeemed at other machines or through websites that are not affiliated with the system 10. Such machines or websites may be in communication with the loyalty server 24 over the network 42. Alternatively, such machines may have an interaction terminal 14 that may communicate with the personal terminal 12 of the user 16. Other configurations are also possible. Further, a benefit may reward the user 16 in other manners than providing the user 16 with a product or service for free or at a reduced price. For example, the user 16 may not receive a free product or service, or a discount toward a product or service in some embodiments, such as in embodiments in which a benefit is an obligation on behalf of the party providing the benefit to match a charitable contribution of the user 16.

It also should be noted that the loyalty server 24 may be omitted completely in some embodiments. In such embodiments, benefits may be stored on the personal terminal 12 or any other components of the system 10, and such benefits may be redeemed at the equipment 20 or through other devices that accept the benefit, although other configurations are possible.

The embodiments described above are not exclusive and the system 10 may include multiple different embodiments or have elements of multiple different embodiments. For example, the system 10 may include any number of personal terminals 12 and a number of interaction terminals 14. The personal terminals 12 may be associated with a number of users 16, and the interaction terminals 14 may be associated with a number of products 18, equipment 20, and promotional objects 22. The user 16 may use the same personal terminal 12 to interact with each of the different products 18, equipment 20, and promotional objects 22. Thus, the user 16 may carry one personal terminal 12 and may present the personal terminal 12 at the different products 18, equipment 20, and promotional objects 22 to receive benefits, such as loyalty points. In some cases, the user 16 also may use the personal terminal 12 to redeem the benefits at the equipment 20 or to complete cashless transactions at the equipment 20, such as transactions paid for by credit card, debit card, or from the pre-paid cash balance associated with the account 68 of the user 16.

Embodiments of the system 10 described above may be suited for broad implementation. Relatively complex and/or expensive interaction terminals 14 may be deployed on newer or more sophisticated equipment 20, on equipment 20 that is located in a relatively high traffic area, or on equipment 20 that moves a relatively high volume of products. Such an interaction terminal 14 may be integrated with the equipment 20. Relatively less complex and/or less expensive terminals 14 may be deployed on equipment 20 that is relatively older or less sophisticated, on equipment 20 that is located in a relatively low volume area, or on equipment 20 that moves a relatively low volume of products. Such interaction terminals 14 may be deployed by mounting or associating with the equipment 20 instead of integrating with the equipment 20. Such interaction terminals 14 may also be mounted on or associated with the disposable packaging of a product 18 or a promotional object 22, such as an advertisement or a display. Thus, the system 10 is adapted to be broadly implemented both across new infrastructure and within the existing base of equipment 20. When cost effective, the interaction terminal 14 may be integrated with the equipment 20, so that in addition to obtaining benefits at the equipment 20, the user 16 may use the personal terminal 12 to redeem benefits and perform cashless transactions at the equipment 20. When integrating the interaction terminal 14 with the equipment 20 is not cost effective or feasible, the interaction terminal 14 may be mounted to or otherwise associated with the product 18, equipment 20, or promotional object 22, so that the user 16 is still able to obtain benefits using the personal terminal 12. Such a system rewards the user 16 for interacting with equipment 20 that may or may not be integrated with the interaction terminal 14, utilizing integrated interaction terminals 14 to provide the user with increased functionality when feasible, yet utilizing mounted or associated interaction terminals 14 to reward the user 16 when integration is prohibitively expensive, difficult to effectuate, or impossible. For example, the user 16 may obtain benefits from products 18 having disposable packaging and from older equipment 20 that cannot be integrated with new technology in a cost effective manner.

Figure 2:
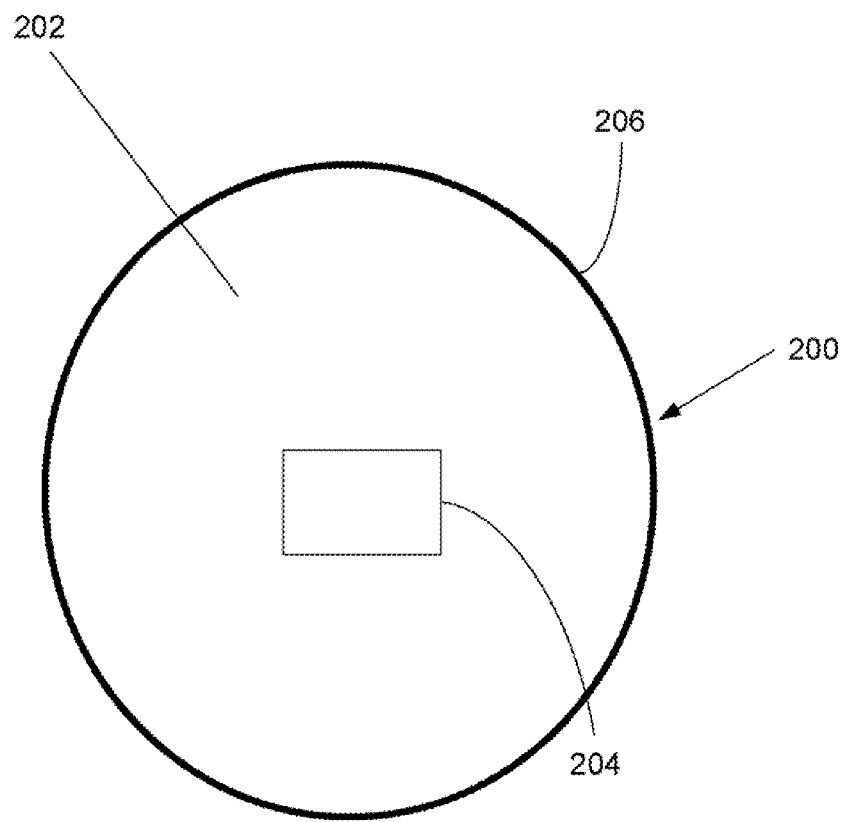
FIG. 2 is a perspective view of an embodiment of a personal terminal.

FIG. 2 is a perspective view of an embodiment of a personal terminal 200. The personal terminal 200 can be formed as an iconic fashion item that also incorporates operational components, such as electronics. In this regard, the personal terminal 200 may be suited to be incorporated into one of a number of fashion designs, such as a key chain, a necklace, or clothing, among others. In addition, the personal terminal 200 also incorporates operation components such that the personal terminal 200 can be used to identify a user, transmit a form of payment, store information, process signals transmitted between the personal terminal and the interaction terminal, and communicate with one or more of the interaction terminals, the loyalty server, or one or more intermediate devices, among others, as generally described above.

The personal terminal 200 can be configured to operate in a passive mode, an active mode, or in a hybrid mode. In the passive mode the personal terminal 200 can be interrogated by and can communicate with the interaction terminal but may not communicate with other data processing devices, such as vending or host equipment or a network. In the active mode, the personal terminal 200 can communicate with one or more other data processing devices and resources, such as a wireless device and/or a loyalty server, among others. In the hybrid mode the personal terminal 200 can operate in either the passive mode or the active mode.

In embodiments in which the personal terminal 200 is configured to operate in the passive mode, the personal terminal 200 may not be adapted to communicate with data processing devices other than the interaction terminal. Thus, the personal terminal 200 may be relatively less expensive to manufacture, and the interaction terminal may be responsible for at least some transaction processing.

When the personal terminal 200 is configured to operate in the active mode, the personal terminal 200 may be adapted to communicate with data processing devices other than the interaction terminal. Thus, the interaction terminal may be relatively less expensive to manufacture, as the interaction terminal may not be responsible for a significant portion of the transaction processing. Instead, the personal terminal 200 may provide the networking functionality to effectuate transaction processing. Such networking functionality may be effectuated by the personal terminal 200 communicating, either directly or indirectly, with data processing devices such as the loyalty server. For example, the personal terminal 200 may communicate by way of the intermediate device, which may be a personal computer, to the data processing resource, such as the loyalty server. As another example, the personal terminal 200 may communicate by way of a wireless device, such as cellular phone, among others. In the hybrid mode, the personal terminal 200 may be adapted to interact either passively or actively with the interaction terminal.

In some embodiments, the personal terminal 200 can include a charm or a fob 202 and an encapsulation 204. Although a range of materials such as metal, plastic, glass, and other materials can be used for the various components of the personal terminal 200, in the illustrated embodiment, the charm 202 is formed from glass, and the encapsulation 204 is formed from metal. The operational components of the personal terminal 200, such as the processor, memory, and interaction terminal interface, are enclosed inside the encapsulation 204, which is securely embedded within the charm or fob 202. For example, the interaction terminal interface may include an antenna that can communicate through the encapsulation, and the network interface or intermediate device interface may wirelessly communicate through the encapsulation. The charm or fob 202 may be releasably secured by a secure clip 206 to an item, such as a keychain, armband, cell phone. In operation, the user may position the personal terminal 200, while secured into position on the item by the secure clip 206, proximate to an interaction terminal to invoke operation. Alternatively, the user may remove the personal terminal 200 from the secure clip 206 and position the personal terminal 200 proximate to the interaction terminal to invoke operation.

For example, a user having the personal terminal 200 secured by the secure clip 206 on a key chain may find it easier to position the key chain proximate to the interaction terminal to invoke operation. Alternatively, a user having the personal terminal 200 secured by the secure clip 206 on a pair of pants may remove the personal terminal 200 from the secure clip 206 in order to position the personal terminal 200 proximate to an interaction terminal to invoke operation.

FIGS. 3-12 illustrate embodiments of the personal terminal associated with various items. FIG. 3A illustrates an embodiment of a personal terminal 300 that can be secured by an embodiment of a secure clip, such as the secure clip 302 shown in FIG. 3B. The personal terminal 300 can be inserted into, retained by, and removed from the secure clip 302, as shown in FIG. 3C. The secure clip 302 may be adapted such that the user can remove the personal terminal 300 from the secure clip 302 when the personal terminal 300 is needed, and secure the personal terminal 300 in secure clip 302 when the personal terminal 300 is not needed. The secure clip 302 may be made from any resilient material, such as plastic or rubber, that gives when the personal terminal 300 is inserted into the secure clip 302, and thereafter returns to grasp or hold the personal terminal 300 within the secure clip 302. In other cases, the secure clip 302 may include a releasable clasp, in which case the secure clip 302 may be made from metal or any other material. A range of other configurations are within the skill of a person in the art.

Figure 3D:
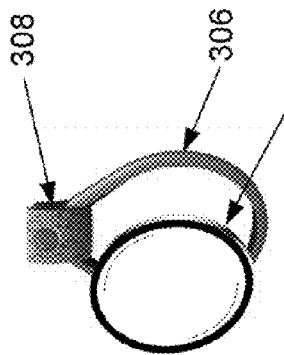
Figure 3E:
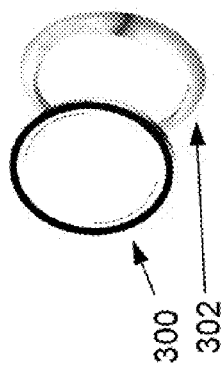
Figure 3B:
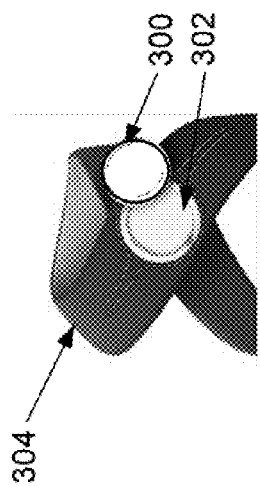
Figure 3C:
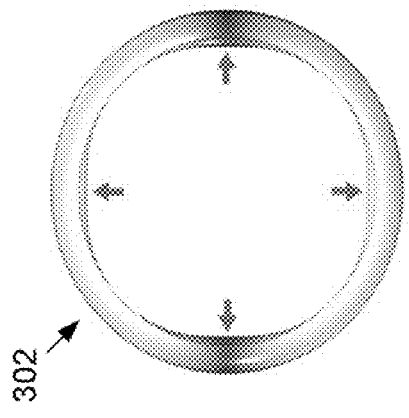
Figure 3A:
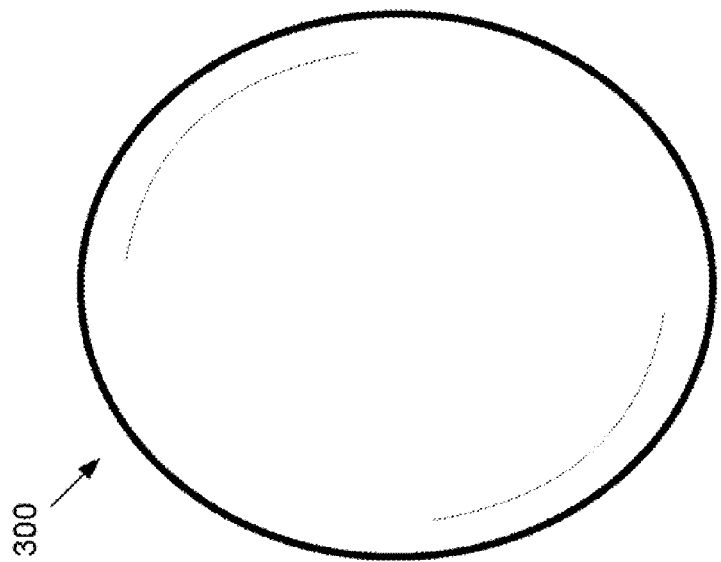

For example, the personal terminal 300 can be secured by secure clip 302 in an arm band 304, as shown in FIG. 3D. In another embodiment, the personal terminal 300 can also be secured by a secure clip 306 in a wrist band 308, as shown in FIG. 3E. In other embodiments, the personal terminal 300 can be secured by a secure clip 302 and the secure clip 302 can be secured to other fashion items or to other consumer selected items, among others.

Figure 4A:
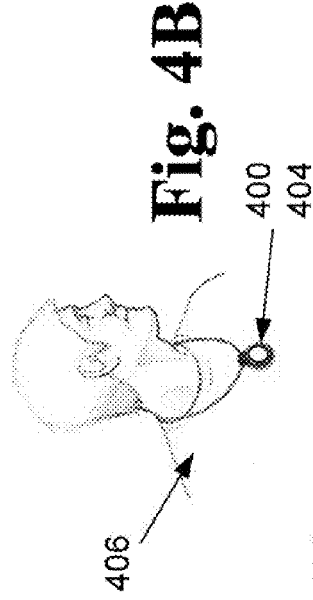
Figure 4B:
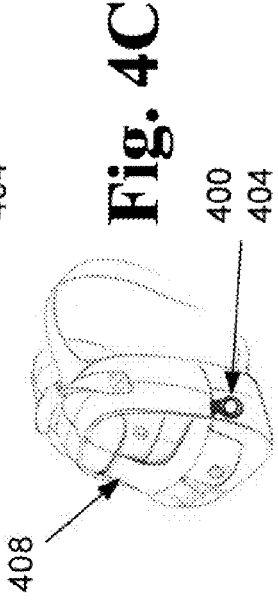
Figure 4C:
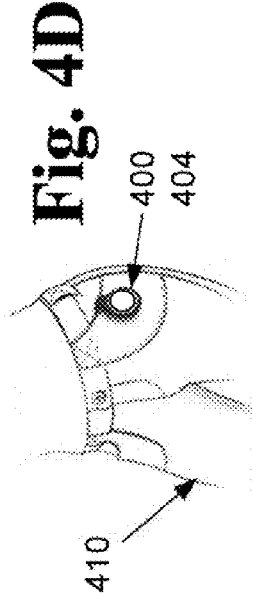
Figure 4D:

FIG. 4A illustrates a personal terminal 400 being held by a secure clip 402 in a pendant 404. Such a pendant 404 can be incorporated into a necklace 406, as shown in FIG. 4B, a backpack 408, as shown in FIG. 4C, a pair of pants 410, as shown in FIG. 4D, or other wearable or portable items depending on the embodiment.

FIG. 5A illustrates a personal terminal 500 being held by a secure clip 502 in an arm band 504. As shown in FIG. 5B, the personal terminal 500 may be released by the secure clip 502 to disassociate the personal terminal 500 from the arm band 504. The arm band 504 can be positioned, for example, on an arm of the user as shown in FIGS. 5C and 5D, although other configurations are possible.

FIG. 6A illustrates a personal terminal 600 being held by a secure clip 602 on a wireless device 604, such as a wireless phone, personal data assistant (PDA), and/or any other wireless device. Again, the personal terminal 600 may be disassociated from the secure clip 600, as shown in FIG. 6B. The personal terminal may also be associated with portable items or other items to be carried by the user. For example, in FIG. 7, an embodiment of a personal terminal 700 is associated with a notebook 702, and in FIG. 8, an embodiment of a personal terminal 800 is associated with a pocketbook 802.

Figure 9A:
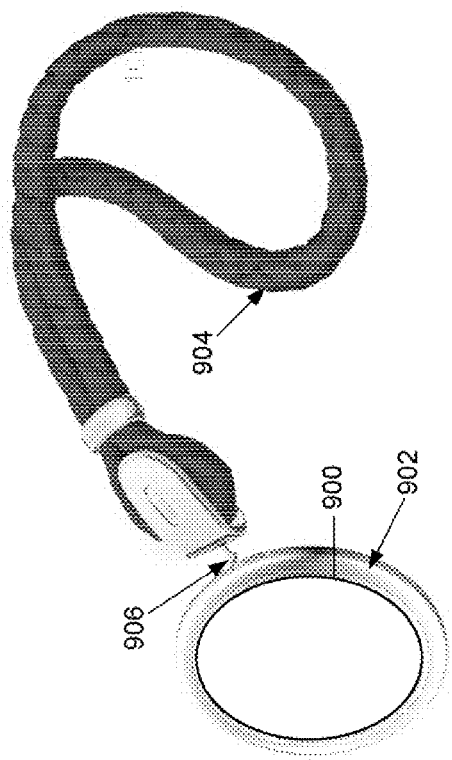
Figure 9B:
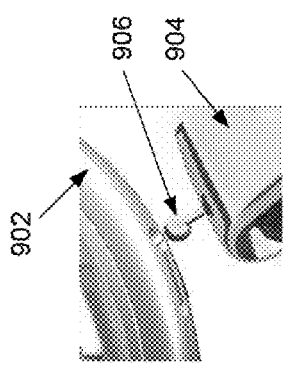

FIG. 9A illustrates an embodiment of a personal terminal 900 being secured by a secure clip 902 to a lanyard 904. A quick disconnect 906 permits separating the personal terminal 900 from the lanyard 904. The quick disconnect 906 can be used in combination with or as an alternative to the secure clip 902.

Figure 10:
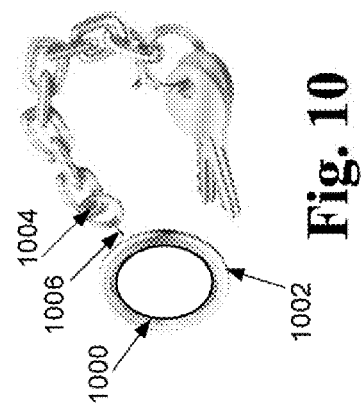
Figure 11:
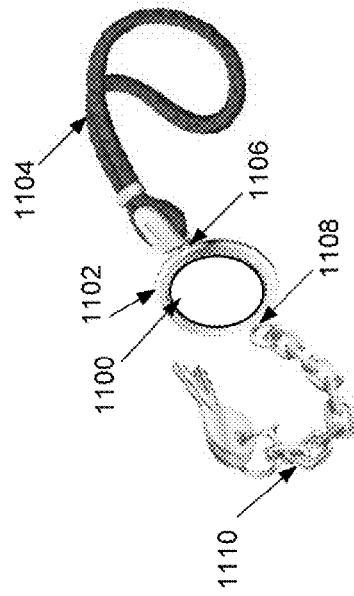

FIG. 10 illustrates an embodiment of a personal terminal 1000 secured by a secure clip 1002 and a quick disconnect 1006 to a keychain 1004. The user can carry the personal terminal 1000 using the keychain 1004. The personal terminal 1000 can be separated from the keychain by releasing the personal terminal 1000 from the secure clip 1002 or by releasing the quick disconnect 1006 from the keychain 1004. FIG. 11 illustrates a lanyard 1104 and a keychain 1110 interconnected by way of quick disconnects 1106 and 1108. The user can connect the lanyard 1104 and the keychain 1110 together using the quick disconnects 1106 and 1108. The lanyard 1104 can be worn on the body of the user, so that both the personal terminal 1100 and the keychain 1110 of the user can be transported with the user via the lanyard 1104.

FIG. 12A illustrates an embodiment of a personal terminal 1200 being held by a secure clip 1202 to a strap 1204. The personal terminal 1200 may be releasably secured to the strap 1204 by the secure clip 1202, as shown in FIG. 12B. The user can wear the strap 1204 on his body as shown in FIG. 12C, or the user can associate the strap 1204 with an object, such as a handbag 1206, as shown in FIG. 12D.

Figure 13:
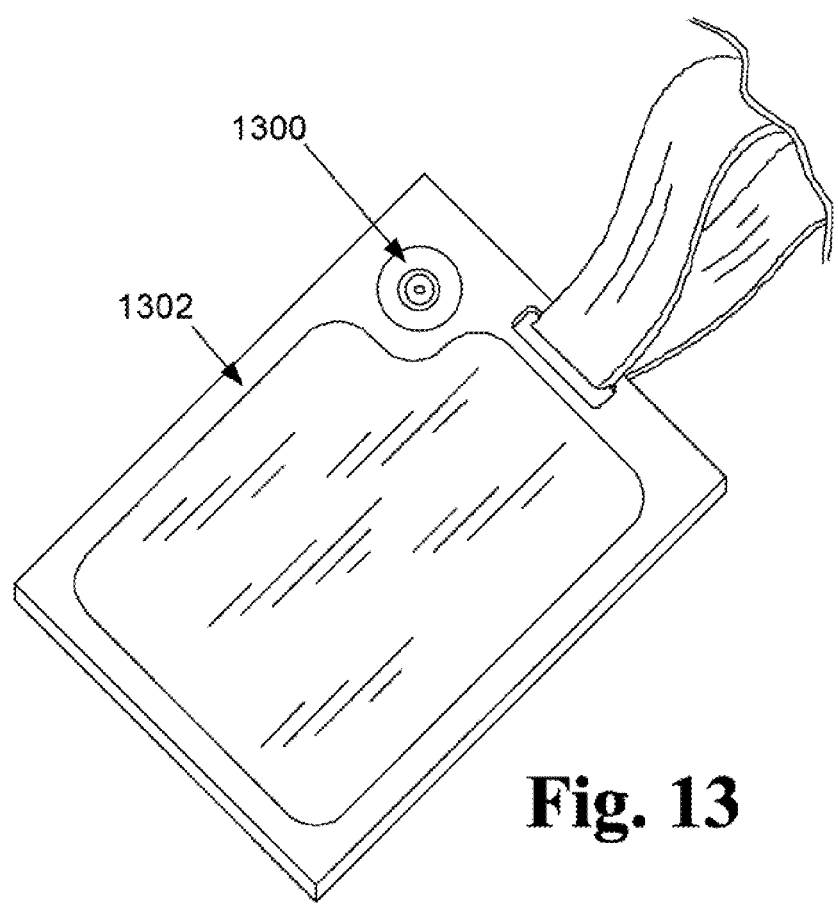
FIG. 13 illustrates an embodiment of a personal terminal associated with a card in accordance with an embodiment of the invention.

FIG. 13 illustrates an embodiment of a personal terminal 1300 associated with a card 1302. The card 1302 may be an identification card, a credit card, a hotel room key card, an employee badge, a student ID badge, a prisoner badge, a guest or VIP badge, or any other kind of card. The user may be likely to carry the card 1300 with him and therefore the personal terminal 1300 may be accessible.

Figure 14:
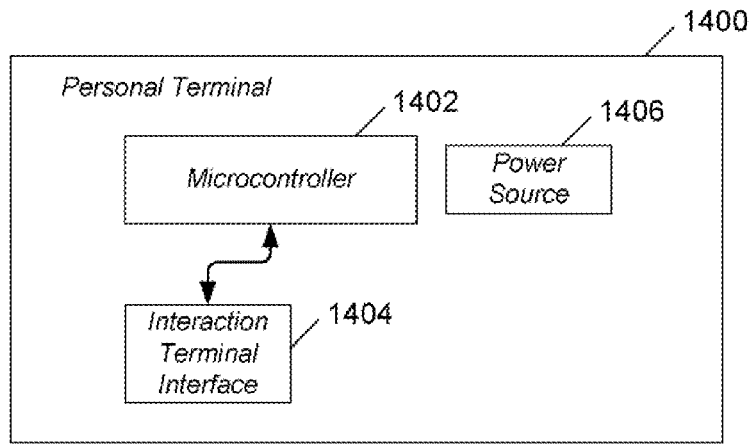
FIG. 14 illustrates a block diagram of an embodiment of a personal terminal adapted for passive mode applications in accordance with an embodiment of the invention.
Figure 15:
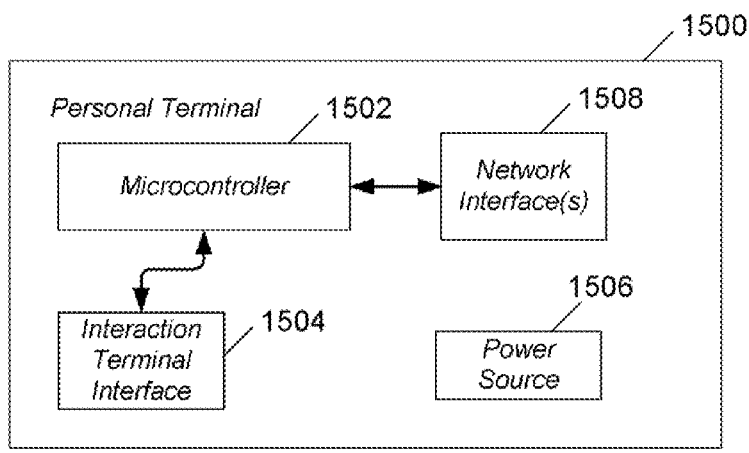
FIG. 15 illustrates a block diagram of an embodiment of a personal terminal adapted for active mode applications in accordance with an embodiment of the invention.
Figure 16:
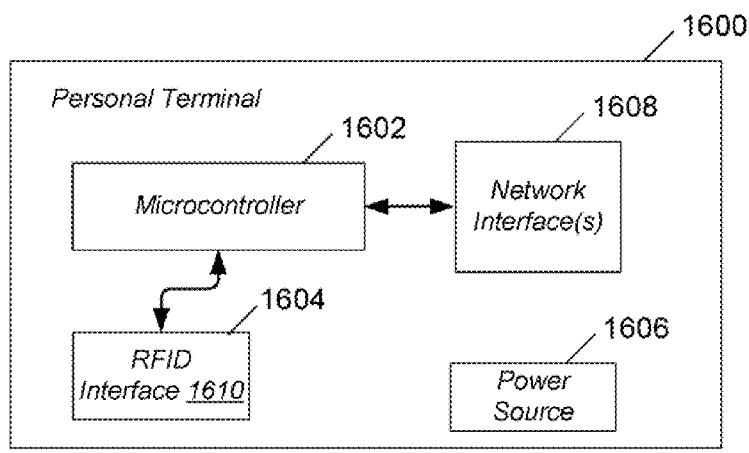
FIG. 16 illustrates a block diagram of an embodiment of a personal terminal adapted for active mode applications in accordance with an embodiment of the invention.

FIGS. 14-16 illustrate block diagrams for various embodiments of personal terminals. The personal terminal may include a microcontroller that is operationally related to an interaction terminal interface, such as an RFID interface, so that the personal terminal can interface with the interaction terminal. The microcontroller may be operationally related to other interfaces including a network interface, which may be wired or wireless local area network (LAN) or wide area network (WAN) interface. The personal terminal can be configured to implement one or more of these interfaces. The personal terminal and interaction terminal can communicate wired or wirelessly.

The microcontroller can include a combination of processing unit and a memory. The processing unit may be micro processing unit (MPU) or central processing unit (CPU) and the memory may be a random access memory (RAM) or a non-volatile memory. Other processing units and memories may be employed, either separately or in combination. Peripherals and ports may also be included, such as serial ports, general purpose inputs/outputs (GPIO), I²C, serial peripheral interface (SPI), universal asynchronous serial transceiver (UART), IRDA port, analog to digital (A to D), digital to analog (D to A), Ethernet MAC or EMAC interface, or other peripherals or ports.

The user initiates a data communication between a personal terminal and an interaction terminal when the personal terminal is brought into data communication proximity with an interaction terminal. The personal terminal can operate in the passive mode where the personal terminal exchanges data with the interaction terminal and the interaction terminal is responsible for completing the transaction, including transaction processing, and data communication to other data processing resources, such as the loyalty server. Alternatively, the personal terminal can operate in the active mode where the interaction terminal provides data to the personal terminal and the personal terminal is responsible for transaction processing or communicating with other data processing resources such as the loyalty server.

FIG. 14 illustrates a block diagram of an embodiment of a personal terminal 1400 adapted to operate in the passive mode. As shown, the personal terminal 1400 includes a microcontroller 1402 that is operationally related to an interaction terminal interface 1404. The interaction terminal interface 1404 enables the personal terminal 1400 to communicate with the interaction terminal. The interaction terminal interface 1404 can implement any communication technology, whether short range or long range, wired or wireless. Example communication technologies that may be implemented include wireless personal area network technology, proximity card or smartcard technology, near field communication technology, radio frequency (RF) or RFID technology, infrared, laser or other optical communication technology, touch and other proximity related technology, among other communication technologies or any combination of these or other technologies.

In this embodiment, the personal terminal 1400 operates in the passive mode, using the interaction terminal interface 1404 to communicate with an interaction terminal. Such a personal terminal 1400 may be relatively low cost. As such, relatively high quantities of the personal terminal 1400 can be deployed relatively inexpensively. A power source 1406 can be utilized to provide power to the personal terminal 1400. However, the power source 1406 may be omitted from at least some of the passive mode embodiments.

FIG. 15 illustrates a block diagram of an embodiment of the personal terminal 1500. As shown, the personal terminal 1500 includes a microcontroller 1502 that is operationally related to an interaction terminal interface 1504 and a network interface 1508. The personal terminal 1500 may be configured to communicate via the interaction terminal interface 1504 with one or more interaction terminals, and may communicate by way of the network interface 1508 with other data processing resources, such as a loyalty server. The network interface 1508 may be configured to enable communications between the personal terminal and a network. The network can be any kind of network including a LAN, a WAN, a private network, the internet, a cellular network, any other type of network, or combinations thereof. Communication between the personal terminal 1508 and the network may be wired or wireless. For example, the network interface 1508 may include a plug, such as a USB plug, that is adapted to interface with a port, such as a USB port, on a device that is connected to the network, such as a computer. As another example, the network interface 1508 may enable wireless communication between the personal terminal 1500 and the network. For example, the wireless communication may comply with 802.xx standards defined by IEEE, including wireless local area network standards and wireless personal area network standards, among others. The wireless communication may also comply with infrared communication standards defined by the Infrared Data Association (IrDA). Other configurations are possible. Such a personal terminal 1500 may also be configured to act as a gateway so that the interaction terminal can communicate by way of the personal terminal 1500 with other data processing resources such as the loyalty server. A power source 1506 may be provided in active mode embodiments of the personal terminal, such as the personal terminal 1500.

In another exemplary embodiment, a personal terminal 12 communicates by way of infrared signal (IRDA). In this regard, personal terminal 12 can operate as a consumer interface to vending equipment, and/or a payment device having storing-accessing-loyalty-or other payment functionality, which effectuates the identification of consumer and the billing and/or inventory release for goods and services dispensed from vending machine.

In an exemplary embodiment a microcontroller can be interconnected with an IRDA interface, a LED display interface, and/or a touch input.

In an exemplary embodiment a microcontroller can be a MOTOROLA, MICROCHIP, RABBIT, ZILOG, or other manufacturer or brand, as may be required and/or desired in a particular embodiment. For purposes of disclosure microcontroller can be referred to as a microprocessor.

In an exemplary embodiment an IRDA interface can be used to effectuate data communication with the interaction terminal by way of IRDA interface. Such data communication can include, for example and not a limitation, effectuating a vending cycle with a personal terminal, exchanging data with a interaction terminal, or other types and kinds of data communication with a personal terminal, interaction terminal, data processing device, and/or other types and kinds of devices, as may be required and/or desired in a particular embodiment. Such IRDA can be implemented with a transmitter/receiver IRDA module or other types and kinds of IRDA data communication devices, as may be required and/or desired in a particular embodiment.

In an exemplary embodiment a LED display interface can be implemented to provide LED lighting and display effects. Such LED lighting and display effects, can make use of single and/or multicolor producing LED as to allow a wide range of color options. Such effects can be tailored as may be required and/or desired in a particular embodiment.

In an exemplary embodiment touch input can be utilized to accept consumer input. Such consumer input can be to make product selection, to manage account information, to change functionality of the personal terminal, or other consumer input, as may be required and/or desired in a particular embodiment. In an exemplary embodiment touch input can be by way of capacitive sense, pressure sensitive surfaces, buttons, switches, or other touch input technologies, as may be required and/or desired in a particular embodiment.

FIG. 16 illustrates a block diagram of an embodiment of a personal terminal 1600 adapted for active mode applications. As shown, the personal terminal 1600 may include an interaction terminal interface 1604 that is an RFID interface 1610. In embodiments, the personal terminal 1600 may be configured to communicate via the RFID interface 1610 with one or more interaction terminals. The personal terminal 1600 may also communicate by way of a network interface 1608 with other data processing resources, such as the loyalty server. Such an embodiment of the personal terminal 1600 can be configured to act as a gateway, so that the interaction terminal can communicate by way of the personal terminal 1600 with data processing resources such as the loyalty server. Again, a power source 1606 may be provided.

Figure 17:
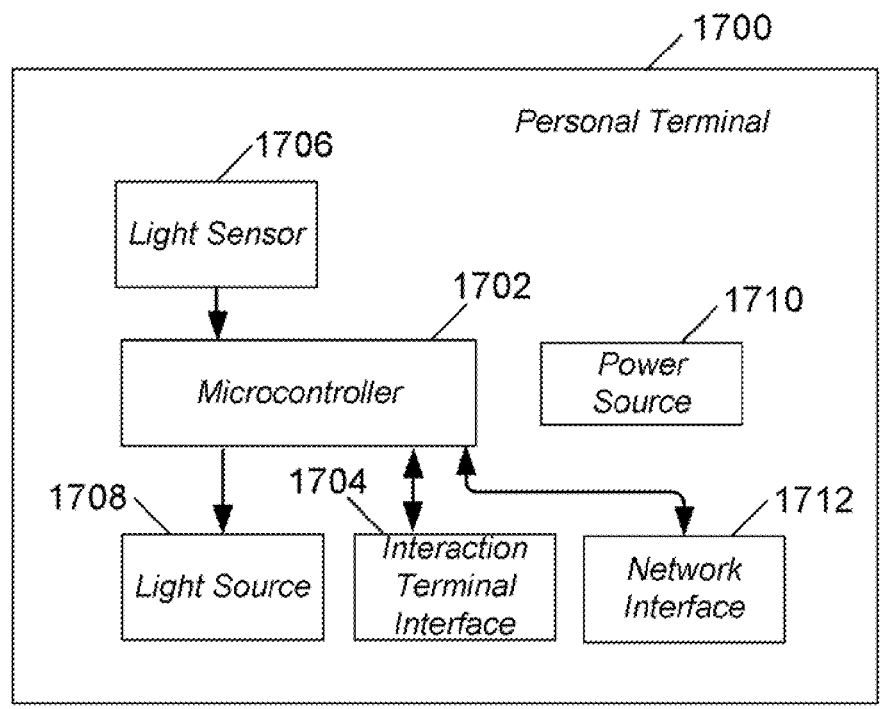
FIG. 17 illustrates a block diagram of an embodiment of a personal terminal adapted to produce light in accordance with an embodiment of the invention.

FIG. 17 illustrates a block diagram of an embodiment of a personal terminal 1700 adapted to produce light. The personal terminal 1700 may include a light source 1708 that is operationally related to a microcontroller 1702. The light source 1708 may generate light. In some cases, the light source 1708 may be able to generate various different colors of light. The light may be generated by the light source 1708 in response to an input of the user, a communication received from the vending or host equipment through the interaction terminal interface 1704, a communication received from the loyalty server through the network interface 1712, or a change in environmental lighting conditions.

In embodiments in which the light source 1708 generates light in response to a change in environmental lighting conditions, the personal terminal 1700 may further include the light sensor 1706. The light sensor 1706 may receive ambient light. The microcontroller 1702 may perform a spectral analysis of the light received by the light sensor and may determine a lighting adjustment factor based at least in part on a spectral analysis. The microcontroller 1702 may operate the light source 1708 based at least in part on the lighting adjustment factor to produce light of a specific color.

Such a configuration may be used with reference to a personal terminal such as the personal terminal 200 described above with reference to FIG. 2. As mentioned, the personal terminal 200 may include a charm or fob 202 and an encapsulation 204. The charm or fob 202 may be made from a translucent material, such as glass or plastic. In some cases, the translucent material may be colored. For example, the translucent material may be a particular color identified with a particular product, service, brand, or entity. Ambient light passing through the charm or fob 202 may alter the color of the translucent material, such that the charm or fob 202 appears to be a color other than the particular color. In such cases, the light source and light sensor may be provided. For example, the light source and the light sensor may be included with the encapsulation 204 embedded in the charm or fob 202. The light sensor may receive ambient light passing through the charm or fob 202. Based on a spectral analysis of the ambient light, a lighting adjustment factor may be determined. The light source may be positioned to emit light through the translucent material of the charm or fob 202. The light source may be operated based at least in part on the lighting adjustment factor to light the charm or fob 202 to the particular color. Specifically, the color of the light emitted by the light source may be selected such that when the light from the light source combines with the ambient light, the charm or fob 202 appears to be the particular color. Thus, the light emitted by the light source may vary depending on the environmental lighting conditions, so that the translucent material of the charm or fob 202 appears to be the particular color.

Figure 18:
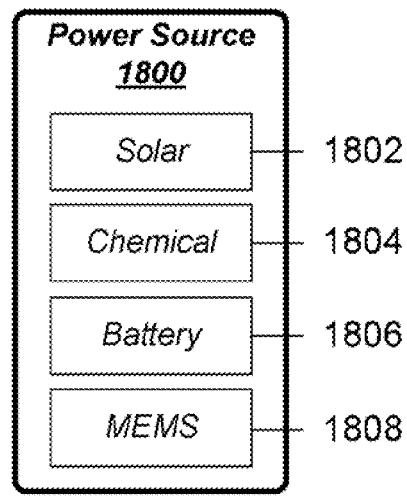
FIG. 18 illustrates a block diagram of an embodiment of a power source of the personal terminal in accordance with an embodiment of the invention.

FIG. 18 illustrates a block diagram of an embodiment of a power source 1800 of a personal terminal. The personal terminal can one or more power sources including a solar power source 1802, a chemical power source 1804, a battery power source 1806, or a micro-electro-mechanical (MEMS) power source 1808, among others. Any one of or combination of these power sources can be used. Alternatively, the personal terminal may be externally powered by the vending equipment, host equipment, a separate power supply, or from other external power sources.

Figure 19:
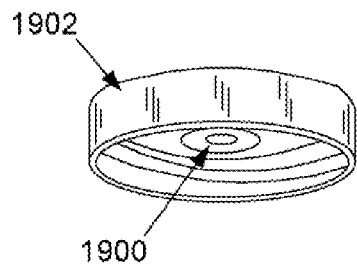
FIG. 19 illustrates an embodiment of an interaction terminal associated with a lid in accordance with an embodiment of the invention.
Figure 20:
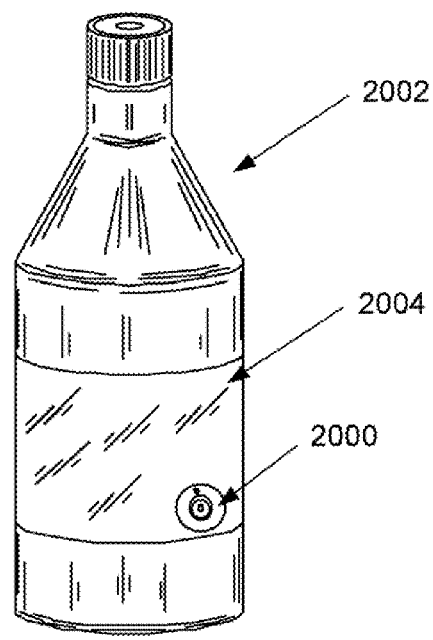
FIG. 20 illustrates an embodiment of an interaction terminal associated with packaging materials of a product in accordance with an embodiment of the invention.
Figure 21:
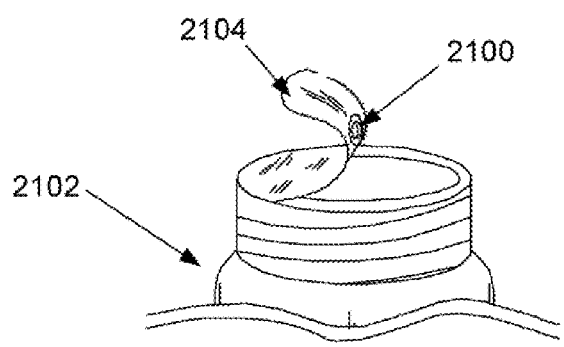
FIG. 21 illustrates an embodiment of an interaction terminal associated with a tamper resistant seal of a product in accordance with an embodiment of the invention.

The interaction terminal may be associated with a product, as shown in FIGS. 19-21. FIG. 19 illustrates an embodiment of an interaction terminal 1900 associated with a lid 1902 of a product. FIG. 20 illustrates an embodiment of an interaction terminal 2000 associated with packaging materials 2004 of a product 2002. FIG. 21 illustrates an embodiment of an interaction terminal 2100 associated with a tamper resistant seal 2104 of a product 2102. The interaction terminal 2100 can be located on either an inside surface of the tamper resistant seal 2104 (closest to the product 2102) or on the outside surface of the tamper resistant seal 2104 (away from the product 2102). Although the interaction terminal is shown on the lid, the packing materials, or the tamper resistant seal of the product, it is understood that the interaction terminal may be associated with the product in any manner.

Associating the interaction terminal with the product causes the product to become a touch point of loyalty, as the user in possession of the product can use the personal terminal to communicate with the interaction terminal and obtain loyalty rewards, product information, or other information.

Associating the interaction terminal with the product also may enable a user having the personal terminal to communicate with the interaction terminal and to pay for the product by way of account information associated with the personal terminal of the user. For example, the personal terminal may store forms of payment such as a stored value, a balance of loyalty reward points, a credit card number, a debit card number, or other means of payment.

Figure 22:
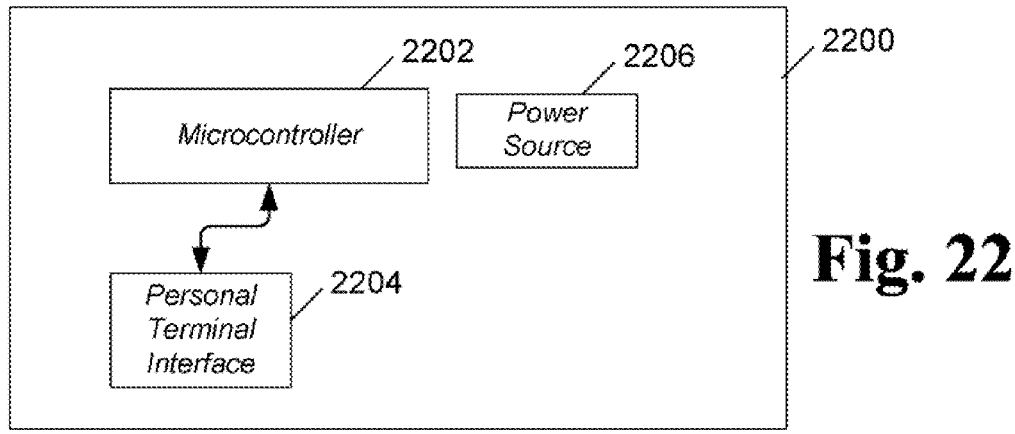
FIG. 22 illustrates a block diagram of embodiment of an interaction terminal adapted to operate in a passive mode in accordance with an embodiment of the invention.
Figure 23:
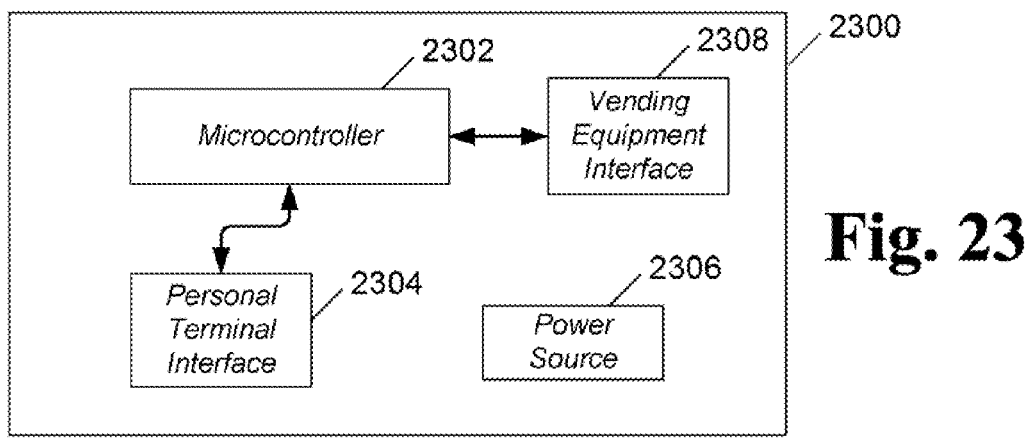
FIG. 23 illustrates a block diagram of an embodiment of an interaction terminal adapted to integrate with vending equipment in accordance with an embodiment of the invention.
Figure 24:
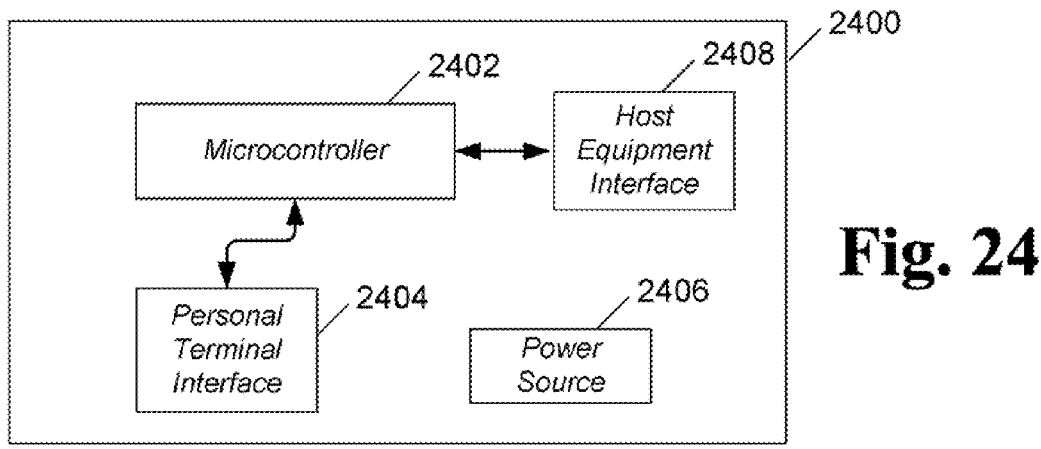
FIG. 24 illustrates a block diagram of an embodiment of an interaction terminal adapted to integrate with host equipment in accordance with an embodiment of the invention.

FIGS. 22-24 are block diagrams of embodiments of an interaction terminal. The interaction terminal can be configured with one or more interfaces including a personal terminal interface, a vending or host equipment interface, and a display interface. In embodiments, the user initiates communication between the personal terminal and the interaction terminal when the personal terminal is brought into communication proximity of the interaction terminal. The interaction terminal can operate in the passive mode where the personal terminal obtains data from the interaction terminal and the personal terminal is responsible for completing the transaction (either real time or at a subsequent time), including processing the transaction, awarding a loyalty reward, managing loyalty reward data, and communicating with data processing resources such as the loyalty server. Alternatively, the interaction terminal can operate in the active mode where the personal terminal provides data to the interaction terminal and the interaction terminal is responsible for transaction processing, awarding the loyalty rewards, managing the loyalty reward data, and communicating with other data processing resources such as the loyalty server.

FIG. 22 illustrates a block diagram of an embodiment of an interaction terminal 2200 adapted for operating in the passive mode. As shown, a microcontroller 2202 is operationally related to a personal terminal interface 2204. The microcontroller 2202 can be any microcontroller, as described above with reference to the microcontroller of the personal terminal. The personal terminal interface 2204 is described below with reference to FIG. 25. In this embodiment, the interaction terminal 2200 operates in the passive mode, using the personal terminal interface 2204 to communicate with the personal terminal. Such an interaction terminal 2200 may be relatively inexpensive to manufacture. As such, a substantial number of the interaction terminals 2200 can be deployed in an area or geography, encouraging the success of the loyalty program by creating more places where the personal terminal can be used. A power source 2206 may power the interaction terminal 2200, although the power source 2206 may be omitted.

FIG. 23 illustrates an embodiment of an interaction terminal 2300 having a microcontroller 2302 operationally related to a personal terminal interface 2304 and a vending equipment interface 2308. The interaction terminal 2300 can be interfaced to the vending equipment through the vending equipment interface 2308. Thus, the personal terminal can interact with the vending equipment by way of the interaction terminal 2300 to effectuate a transaction. A power source 2306 may be provided in such an embodiment.

FIG. 24 illustrates an embodiment of an interaction terminal 2400 having a microcontroller 2402 that is operationally related to a personal terminal interface 2404 and a host equipment interface 2408. The interaction terminal 2400 can be interfaced to the host equipment by way of the host equipment interface 2408. Thus, the personal terminal can interact with the host equipment by way of the interaction terminal 2400 to effectuate a transaction. A power source 2406 may be provided in such an embodiment.

FIG. 25 illustrates a block diagram of an embodiment of a personal terminal interface 2500 of the interaction terminal. The configuration of the personal terminal interface 2500 of the interaction terminal is selected to correspond to the configuration of the interaction terminal interface of the personal terminal. These two interfaces communicate with each other, and therefore these two interfaces implement corresponding technology. Therefore, the personal terminal interface 2500 may implement any of the communication technologies described above with reference to the interaction terminal interface, and the interaction terminal interface may implement any of the communication technologies described below with reference to the personal terminal interface. For example, the personal terminal interface 2500 can include one or more of the following: a radio frequency ID (RFID) interface 2502, a radio frequency interface (RF) 2504, an optical interface 2506, a touch interface 2508, a machine readable interface 2510, such as a barcode, a wired interface 2512, a wireless interface 2514, a biometric interface 2516, or a general purpose input/output interface (GPIO) 2518, among others.

The radio frequency ID (RFID) interface 2502 may allow the interaction terminal to communicate with the personal terminal, or other data processing devices, using RFID technology. For example, the interaction terminal may have RFID data read from it or written to it by the personal terminal or any other RFID tag or reader located external to the interaction terminal. The radio frequency interface (RF) 2504 may allow the interaction terminal to communicate wirelessly. Such an RF interface 2504 can be an 802.11 type interface, a WIFI interface, or a BLUETOOTH interface, among other RF interfaces 2504.

The optical interface 2506 may enable the interaction terminal to communicate wirelessly using optical technology. For example, the optical interface 2506 may be an IRDA interface having a transmitter/receiver IRDA module, or any other configuration that enables IRDA communication.

The touch interface 2508 can be utilized to accept consumer input. Such consumer input can be to make a product selection, to manage account information, to change the color or functionality of the personal terminal, or other consumer input. For example, the touch interface 2508 may be a capacitive sense, a pressure sensitive surface, a button, or a switch. The touch interface 2508 may also have any other configuration, or a combination of any of these and/or other configurations.

The machine readable interface 2510 may enable the interaction terminal to communicate with the personal terminal or other data processing devices using machine readable codes, such as bar codes. The machine readable interface 2510 may include a machine readable code reader, such as a standard reader, a complex symbol reader, or a custom reader, among others, or the machine readable interface 2510 may include a machine readable code, such as a barcode.

The wired interface 2512 may enable the interaction terminal communicate with the personal terminal or another data processing device, using, for example, ETHERNET, FIREWIRE, serial, I2C, SPI, UART, or any other suitable technology. The wireless interface 2514 may wirelessly network the interaction terminal to the personal terminal or other data processing devices using, for example, 802.11-type technology, WIFI, BLUETOOTH, or other wireless technologies or combinations thereof.

The biometric interface 2516 may permit identifying the consumer by fingerprint, voice, eye, or other biometric data. The biometric interface 2516 can be utilized to allow access to and allow certain menu and operational choices based in part on the identification, by biometric methods, of the consumer. The general purpose input/output interface (GPIO) 2518 can be utilized to provide general purpose inputs and output.

FIG. 26 illustrates a block diagram of an embodiment of a display interface 2600 of the interaction terminal. In embodiments, the display interface 2600 can include one or more of the following: a light emitting diode (LED) display 2602, liquid crystal (LCD)/vacuum florescent (VFD) display 2604, or an audio display 2606, among others.

In embodiments, the display interface 2600 can be used to inform a user with the personal terminal of certain conditions or to express a social aspect related to the user. Such social aspects may include signals of mood, interest, relationship status, and/or other social aspects of the user. Other conditions might include product available, sold out, hot product now, product ready, or other conditions.

FIG. 27 illustrates a block diagram of an embodiment of a vending equipment interface 2700 of the interaction terminal. As mentioned above, the vending equipment interface 2700 may enable the interaction terminal to communicate with the vending equipment. Depending on the configuration of the vending equipment, the vending equipment interface 2700 can be one of or a combination of the following: a multi-drop-bus (MDB) interface 2702, a data exchange interface (DEX) 2704, a vending BDV interface 2706, a vending EXECUTIVE MECH interface 2708, a control area network (CAN) interface 2710, a universal serial bus (USB) interface 2712, a serial interface 2714, or a general purpose input/output (GPIO) interface 2716, among others. The MDB interface 2702 and the DEX interface 2704 may conform to vending industry standards such as National Automatic Merchandising Association MDB specification, EVS standards, the European Vending Association DEX specification, or other industry standards.

FIG. 28 illustrates a block diagram of an embodiment of a host equipment interface 2800 of the interaction terminal. The interaction terminal can be interconnected with or operationally related to the host equipment via the host equipment interface 2800. The host equipment may be equipment that can be monitored or controlled by the interaction terminal. The host equipment interface 2800 may be one of or a combination of the following: a credit card terminal interface 2802, a point-of-sale (POS) equipment interface 2804, a wired or wireless local area network interface 2806, a wired or wireless wide area network (WAN) interface 2810, a property management system interface 2808, a universal serial bus (USB) interface 2812, a serial interface 2814, or a general purpose input/output interface 2816, among others.

The interaction terminal can be interfaced to a credit card terminal by way of the credit card interface 2802. When the personal terminal interacts with the interaction terminal, the interaction terminal can communicate with the credit card terminal by way of the credit card terminal interface 2802. Thus, the credit card terminal may receive a credit card number stored on the personal terminal through the credit card terminal interface 2802 of the interaction terminal. Such a configuration permits inexpensively adapting a preexisting infrastructure of credit card terminals to accept a credit card number stored on the personal terminal.

The interaction terminal can also be configured to communicate by way of the LAN interface 2806 with other data processing resources, such as the loyalty server. Thus, the interaction terminal can be configured to act as a gateway, such that the interaction terminal and the personal terminal can communicate with data processing resources through the LAN interface 2006.

The interaction terminal can be configured to communicate by way of a wired or wireless WAN interface 2810 with other remote data processing resources, such as a loyalty server. Thus, the interaction terminal can be configured to act as a gateway such that the interaction terminal and the personal terminal can data communicate with remote data processing resources through the WAN interface 2810 of the interaction terminal.

The personal terminal can communicate with the interaction terminal, and the interaction terminal can be configured to interface to a PMS system by way of PMS interface 2808. In general, a property management system (PMS) is used in hotels, restaurants, and other establishments to monitor, maintain, and charge guests for products and services. Once interfaced, the interaction terminal may process personal terminal initiated transactions with the PMS system. Thus, the personal terminal can cause transactions to be processed by the PMS system and as such charge purchases initiated by the personal terminal to hotel room guests, and/or to other individuals and guests as may be required and/or desired by the particular embodiment.

FIG. 29 illustrates a block diagram of an embodiment of a power source 2900 of the interaction terminal. The power source 2900 may be one or more of the following: a solar power source 2902, a chemical power source 2904, a battery power source 2906, or a MEMS power source 2928. Power may also be RF or optically induced through interaction with the personal terminal. Additionally the interactive terminal may obtain power from the vending equipment, the host equipment, a separate power supply, or from other external power sources.

Figure 30:
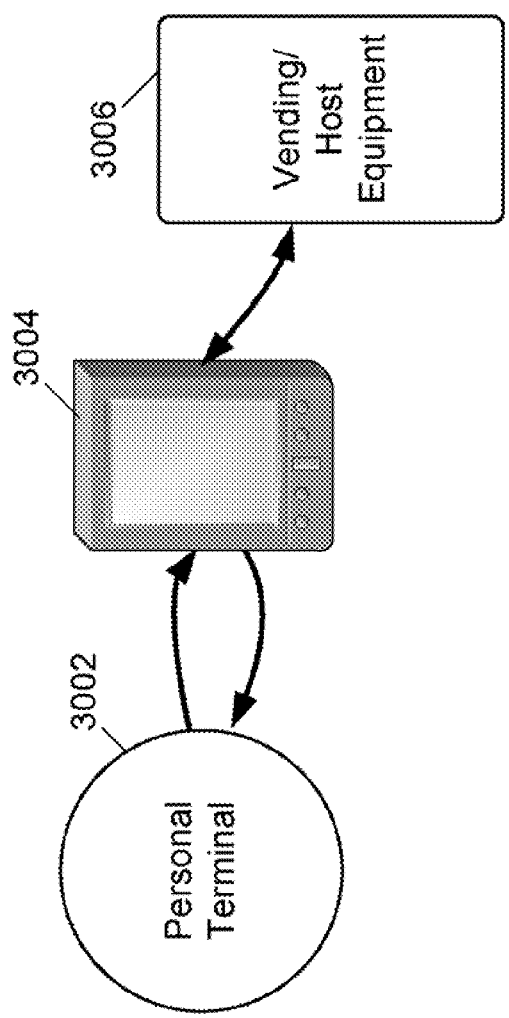
FIG. 30 is a flow diagram illustrating an embodiment of a passive mode personal terminal interacting with an interaction terminal in accordance with an embodiment of the invention.

FIG. 30 is a flow diagram illustrating an embodiment of a personal terminal 3002 interacting with an embodiment of an interaction terminal 3004. The personal terminal 3002 is configured to operate in the passive mode. When the personal terminal 3002 is brought into proximity of the interaction terminal 3004, the personal terminal 3002 and the interaction terminal 3004 can communicate. Such communication can include the reading and/or writing of data to and/or from the personal terminal 3002. Because the personal terminal 3002 operates in the passive mode, the personal terminal 3002 may not be in communication with other data processing resources, such as a loyalty server. The interaction terminal 3004 may be configured to interface with vending or host equipment 3006 to effectuate transactions initiated by the personal terminal 3002.

Figure 31:
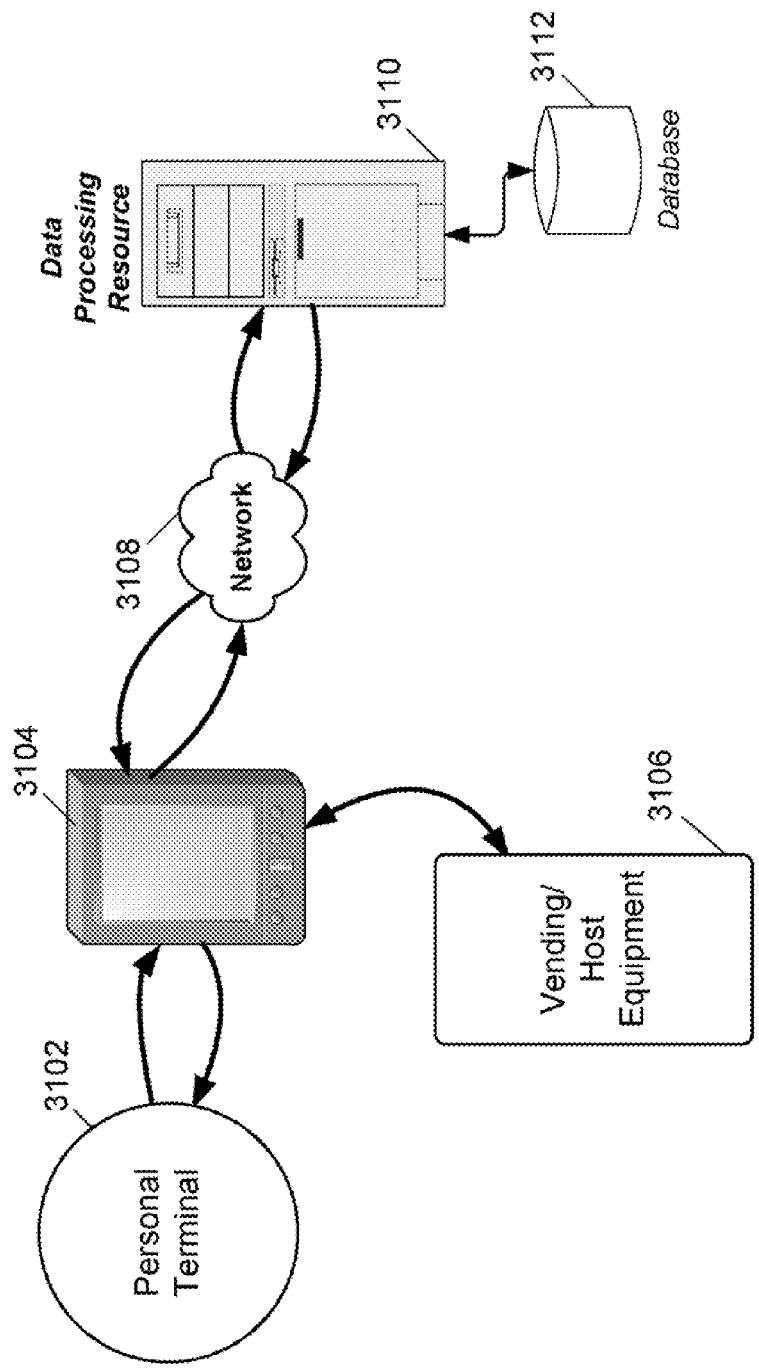
FIG. 31 is a flow diagram illustrating an embodiment of a passive mode personal terminal interacting with an interaction terminal in accordance with an embodiment of the invention.

FIG. 31 is a flow diagram illustrating an embodiment of a personal terminal 3102 interacting with an embodiment of an interaction terminal 3104. As shown, the personal terminal 3102 operates in the passive mode. The personal terminal 3102 can be brought into proximity of the interaction terminal 3104 and can communicate with the interaction terminal 3104. Such communication can include the reading and/or writing of data to and/or from the personal terminal 3102. In some cases, the interaction terminal 3104 may be configured to interface with vending or host equipment 3106. Because the personal terminal 3102 operates in the passive mode, the interaction terminal 3104 may communicate with a data processing resource 3110 and possibly a database 3112 to effectuate transactions initiated by the personal terminal 3102. For example, these components may communicate by way of a network 3108, such as the internet, a private network, a virtual private network (VPN), a local network, or any other network.

Figures 32A, 32B:
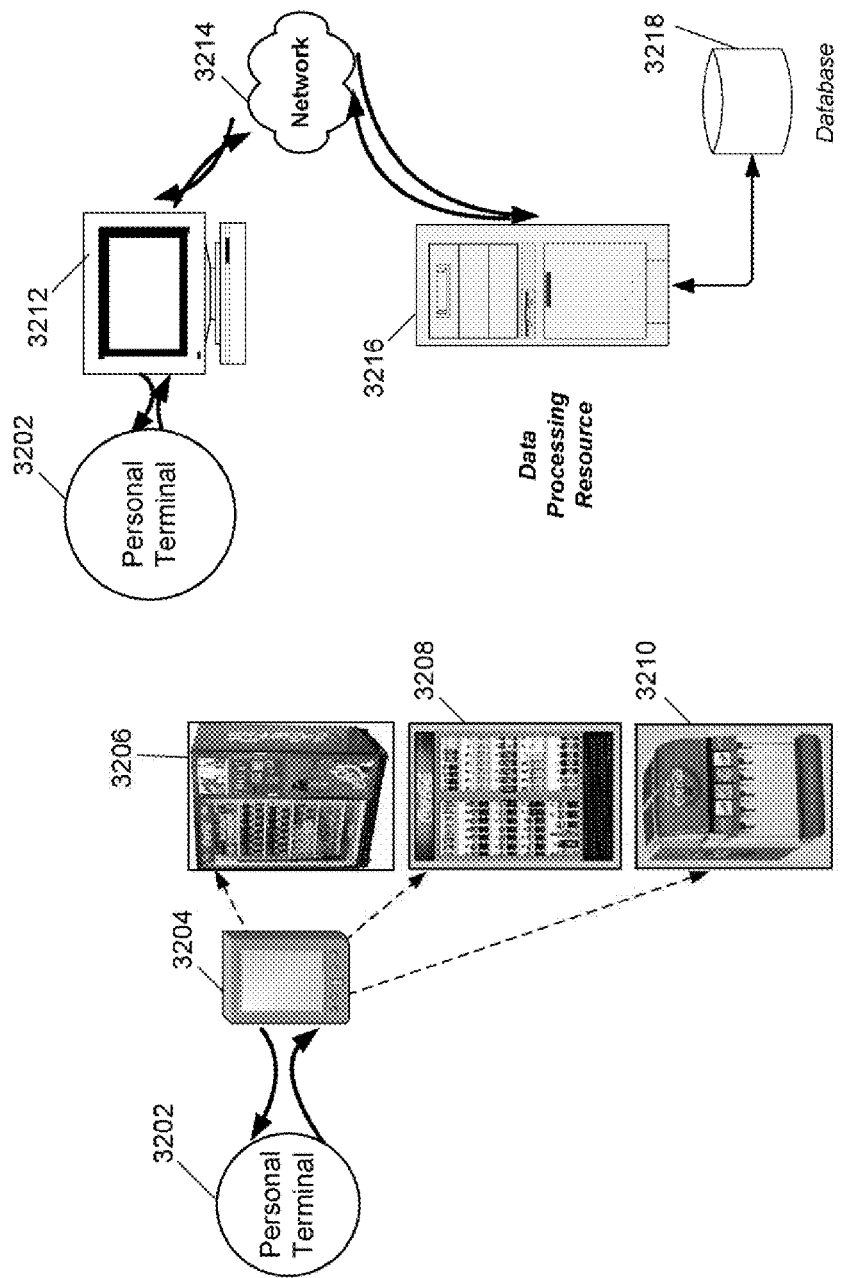
FIG. 32 is a flow diagram illustrating an embodiment of an active mode personal terminal interacting with an interaction terminal and an intermediate device in accordance with an embodiment of the invention.

FIGS. 32A and 32B are flow diagrams illustrating operation of a personal terminal 3202 in the active mode. The personal terminal 3202 may interact with an interaction terminal 3204 and also may interact with an intermediate device 3212, such as a personal computer. As shown in FIG. 32A, the personal terminal 3202 can be brought into proximity of the interaction terminal 3204, so that the personal terminal 3202 and interaction terminal 3204 can communicate. Such communication can include the reading and/or writing of data to and/or from the personal terminal 3202 and/or interaction terminal 3204. The personal terminal 3202 can collect informational data from the interaction terminal 3204 such as loyalty data, location data, asset data, or other kinds of data. In addition, the personal terminal 3106 can transmit data to the interaction terminal 3204, such as firmware upgrades, operational parameter settings, loyalty data, or other kinds of data.

As shown in FIG. 32B, the personal terminal 3202 can then be brought into proximity of the intermediate device 3212, which may be a personal computer or other suitable data processing device. The data collected by the personal terminal 3202 can then be communicated to a data processing resource 3216, such as a loyalty server, by way of the intermediate device 3212 and a network 3214. The data processing resource 3216 can process the data from the personal terminal 3202, and may store the data in a database 3218. The data processing resource 3216 can also communicate, by way of the intermediate device 3212, to the personal terminal 3202, so that firmware, parameter settings, operational data, loyalty data, cashless payment related data, stored value data, consumer data, or other data can be transmitted to the personal terminal 3202. Such data can be intended for use by the personal terminal 3202, or the data may be intended for communication to an interaction terminal 3204.

A consumer loyalty program can be implemented by providing a consumer with the personal terminal 3202 and by affixing a number of interaction terminals 3204 to equipment in retail outlets, such as vending machine 3206, a cooler 3208, and a fountain dispenser 3210, among others. When the consumer and therefore the personal terminal 3202, enter the proximity of the interaction terminal 3204, the two terminals 3202, 3204 can communicate. Such communication can include the personal terminal 3202 receiving data from the interaction terminal 3204. Such data can include, for example, loyalty data, location data, asset data, consumer data, or other data. The consumer can collect loyalty data from a number of interaction terminals 3204, each interaction terminal 3204 being located on one of the pieces of equipment.

The consumer can then transport the personal terminal 3202 into proximity of a personal computer or other intermediate device 3212, such that the personal terminal 3202 can communicate by way of the personal computer or other intermediate device 3212 with the data processing resource 3216. The data processing resource 3216 can be a loyalty server designed to accept and process data from the personal terminal 3202 and administer a loyalty account of the consumer. Consumer loyalty account information or other data can be communicated to the personal terminal 3202 of the consumer by way of the personal computer and/or other intermediate device 3212. The consumer can then continue collecting loyalty rewards from the interaction terminals 3204, and may redeem loyalty awards (where applicable) by paying for products and/or services with the loyalty award data stored on the personal terminal 3202.

In addition, data from the data processing resource 3216, such as the loyalty server and the database 3218 can be uploaded to the personal terminal 3202 as shown in FIG. 32B, and can be communicated to the interaction terminal 3204 as shown in FIG. 32A.

Figures 33A, 33B:
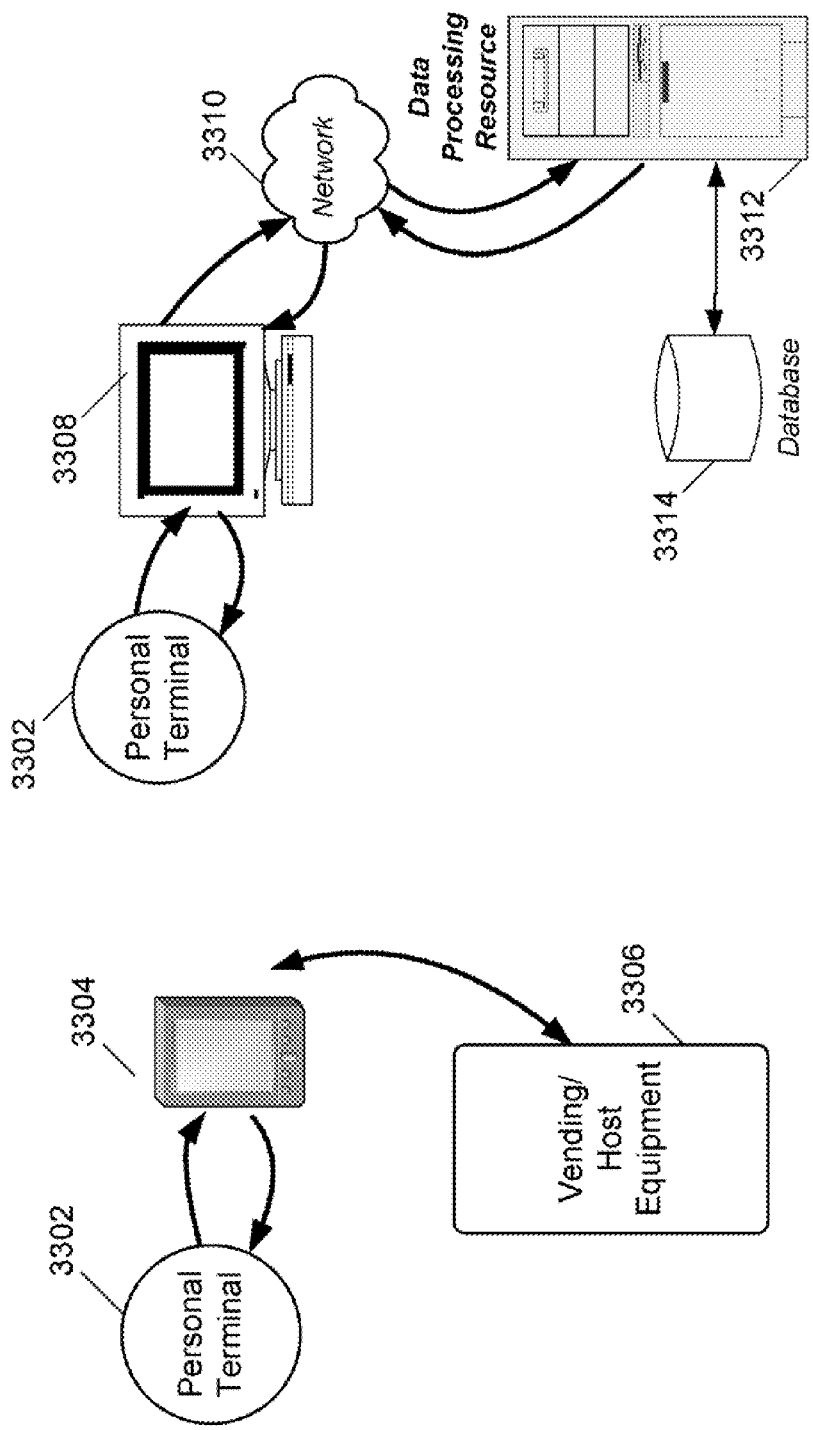
FIG. 33 is a flow diagram illustrating an active mode personal terminal interacting with an interaction terminal and an intermediate device in accordance with an embodiment of the invention.

FIG. 33A-B is a flow diagram illustrating active mode operation of a personal terminal 3302. The personal terminal 3302 can be brought into proximity of an interaction terminal 3304, and the personal terminal 3302 and interaction device 3304 can data communicate. Such communication can include the reading and/or writing of data to and/or from the interaction terminal 3304. The interaction terminal 3304 can be configured to interface with, monitor, or control vending or host equipment 3306. Such monitoring and/or controlling can include effectuating a cashless transaction, vending a product or service, or monitoring or controlling equipment cycles, among others.

The interaction terminal 3304 can be associated with one of a number of different pieces of equipment 3306, so that the consumer can use the personal terminal 3302 to interact with the interaction terminal 3304 for loyalty purposes, or other purposes. In addition, in cases in which the interaction terminal 3304 is operationally related to the vending or host equipment 3306, the consumer can use the personal terminal 3302, by way of the interaction terminal 3304, to communicate with the vending, or host equipment 3306. Thus, the consumer can effectuate cashless payment for products and/or services rendered by the vending or host equipment 3306 using the personal terminal 3302.

A consumer loyalty cashless payment program can be implemented in such cases. A number of interaction terminals 3304 can be affixed to a number of different pieces of vending or host equipment 3306 located in different retail outlets. When the consumer brings the personal terminal 3302 into proximity of one of the interaction terminals 3304, the two terminals 3302, 3304 can communicate. For example, the personal terminal 3302 may receive loyalty data, or may send data to effectuate a vend cycle. The consumer can collect loyalty data and pay for products or services obtained from the associated vending or host equipment 3306.

The consumer can then transport the personal terminal 3302 into proximity of a personal computer or other intermediate device 3308 such that the personal terminal 3202 can communicate, by way of the personal computer or other intermediate device 3308, with the data processing resource 3312. The data processing resource 3312 can be a loyalty or cashless payment server designed to accept and process data from one or more personal terminals 3302 and administer the loyalty and cashless accounts of one or more consumers. The data processing resource 3312 may communicate with a database 3314. As part of the communication update, consumer loyalty data, cashless payment data, account data, or other data can be communicated to the personal terminal 3302 by way of the personal computer or other intermediate device 3308. The consumer can then continue collecting loyalty awards and effectuating cashless transactions at the vending or host equipment 3206, by way personal terminal 3302 communicating with the interaction terminal 3304 and the interaction terminal 3304 communicating with the vending or host equipment 3206.

Figure 34:
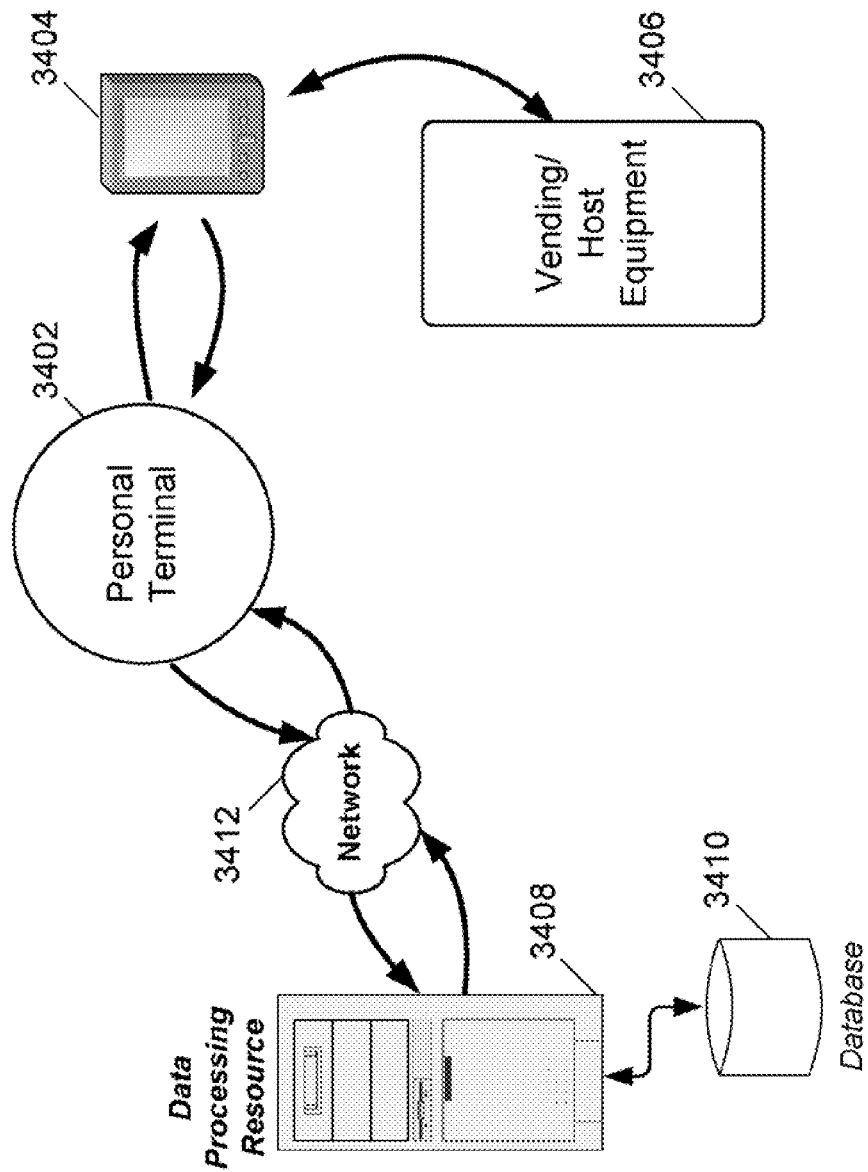
FIG. 34 is a flow diagram illustrating an active mode personal terminal interacting with an interaction terminal and a data processing resource in accordance with an embodiment of the invention.

FIG. 34 is a flow diagram illustrating active mode operation of a personal terminal 3402. The personal terminal 3402 can be brought into proximity of an interaction terminal 3404 and can communicate with the interaction terminal 3404. Such communication can include the reading and/or writing of data to and/or from the interaction terminal 3404. The interaction terminal 3404 may interface with vending or host equipment 3406. The personal terminal 3402 also can be configured to communicate with other data processing resources 3408 and databases 3410 by way of a network 3412 to effectuate loyalty, cashless, or other transactions initiated by the personal terminal 3402.

Figure 35:
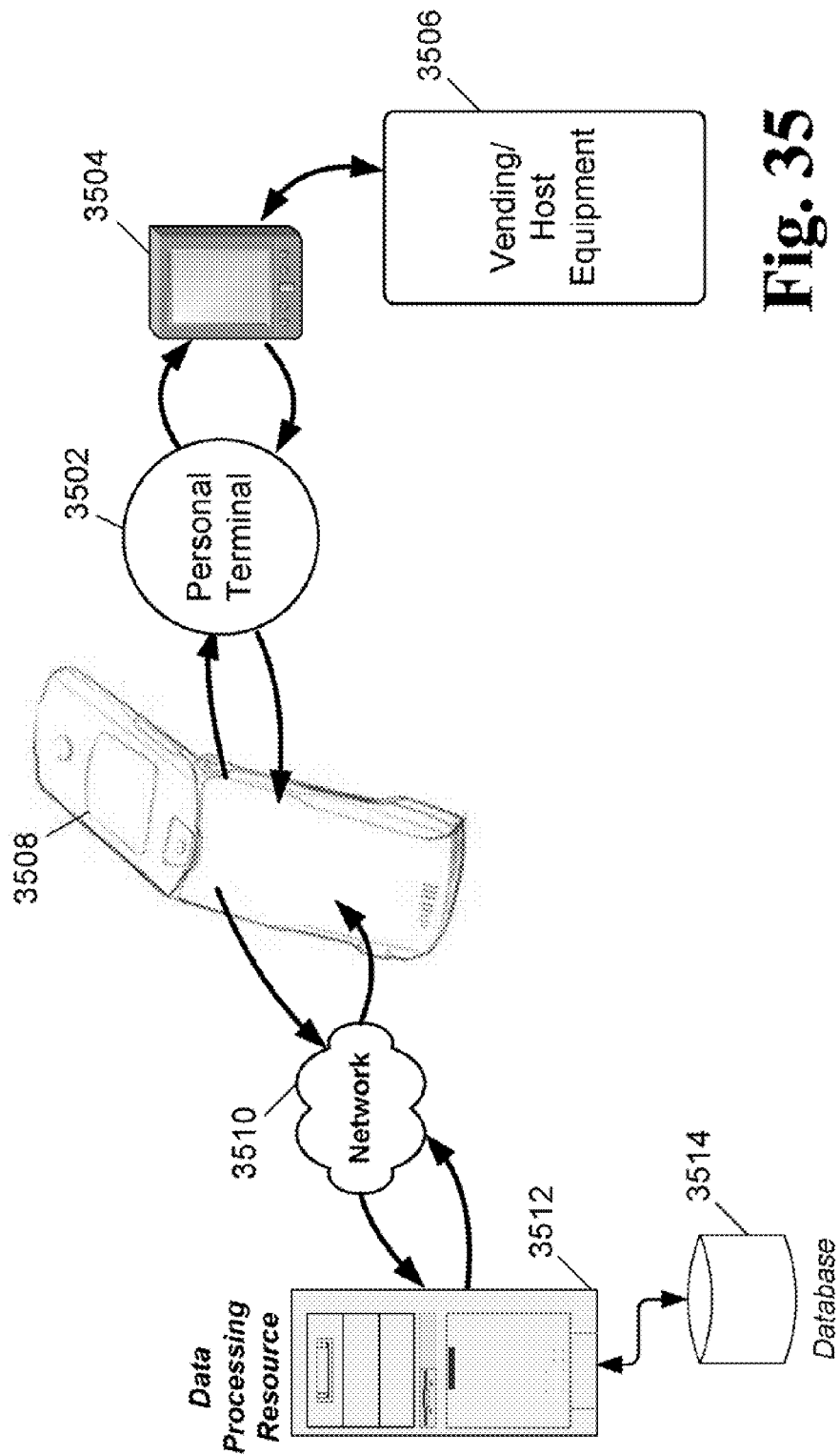
FIG. 35 is a flow diagram illustrating an active mode personal terminal operationally coupled to a wireless device, and interacting with an interaction terminal and a data processing resource in accordance with an embodiment of the invention.

FIG. 35 is a flow diagram illustrating active mode operation of a personal terminal 3502. The personal terminal is operationally coupled to a wireless device 3508. The personal terminal 3502 can be brought into proximity of an interaction terminal 3504, so that the personal terminal 3502 and the interaction device 3504 can communicate. Such communication can include the reading and/or writing of data to and/or from the interaction terminal 3504. The interaction terminal 3504 may interface with vending or host equipment 3506. In addition, the personal terminal 3502 can be configured to communicate with the wireless device 3508. Such communication between the personal terminal 3502 and the wireless device 3508 can be by way of wired or wireless technologies. Furthermore, the personal terminal 3502, by way of the wireless device 3508, can communicate with a data processing resource 3512, such as a loyalty server, and a database 3514. Such communication may occur by way of a network 3510, such as the internet. Thus, loyalty, cashless, or other transactions initiated by the personal terminal 3502 may be completed.

Figure 36:
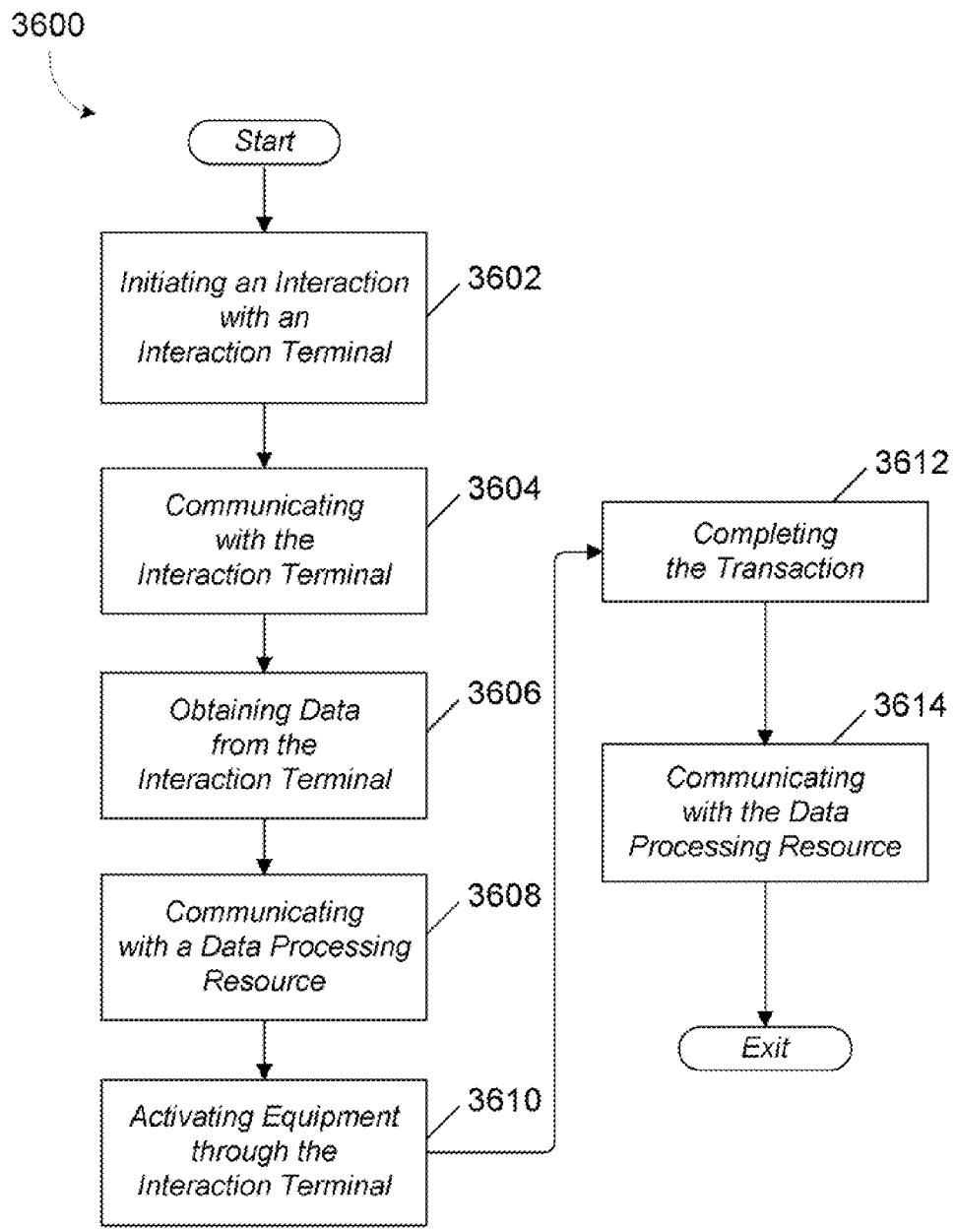
FIG. 36 is a flow diagram illustrating a method of performing a transaction using a personal terminal, in accordance with an embodiment of the invention.

FIG. 36 is a flow diagram illustrating a method 3600 of performing a transaction using a personal terminal. The personal terminal may be brought into communication proximity of an interaction terminal, initiating a transaction between the two terminals. The personal terminal may operate in the active mode, such that the personal terminal can communicate with a data processing resource. The method 3600 begins in block 3602. In block 3602, an interaction with the interaction terminal is initiated. For example, the consumer with the personal terminal may approach the interaction terminal. The method 3600 then moves to block 3604. In block 3604, the personal terminal and the interaction terminal communicate. The method 3600 then moves to block 3606. In block 3606, the personal terminal obtains data from the interaction terminal. The method then moves to block 3608. In block 3608, the personal terminal communicates with a data processing resource, such as a loyalty server. The method 3600 then moves to block 3610.

In block 3610, the personal terminal communicates with the interaction terminal to activate the vending or host equipment. The method 3600 then moves to block 3612. In block 3612, the transaction is completed. For example, the equipment may deliver the product or service, and result data may be communicated from the equipment through the interaction terminal to the personal terminal. The result data may include loyalty data, among others. The method 3600 then moves to block 3614. In block 3614 the personal terminal communicates with the data processing resource. For example, the personal terminal may communicate result data, such as loyalty data, transaction data, or other data. The method 3600 then ends.

Figure 37:
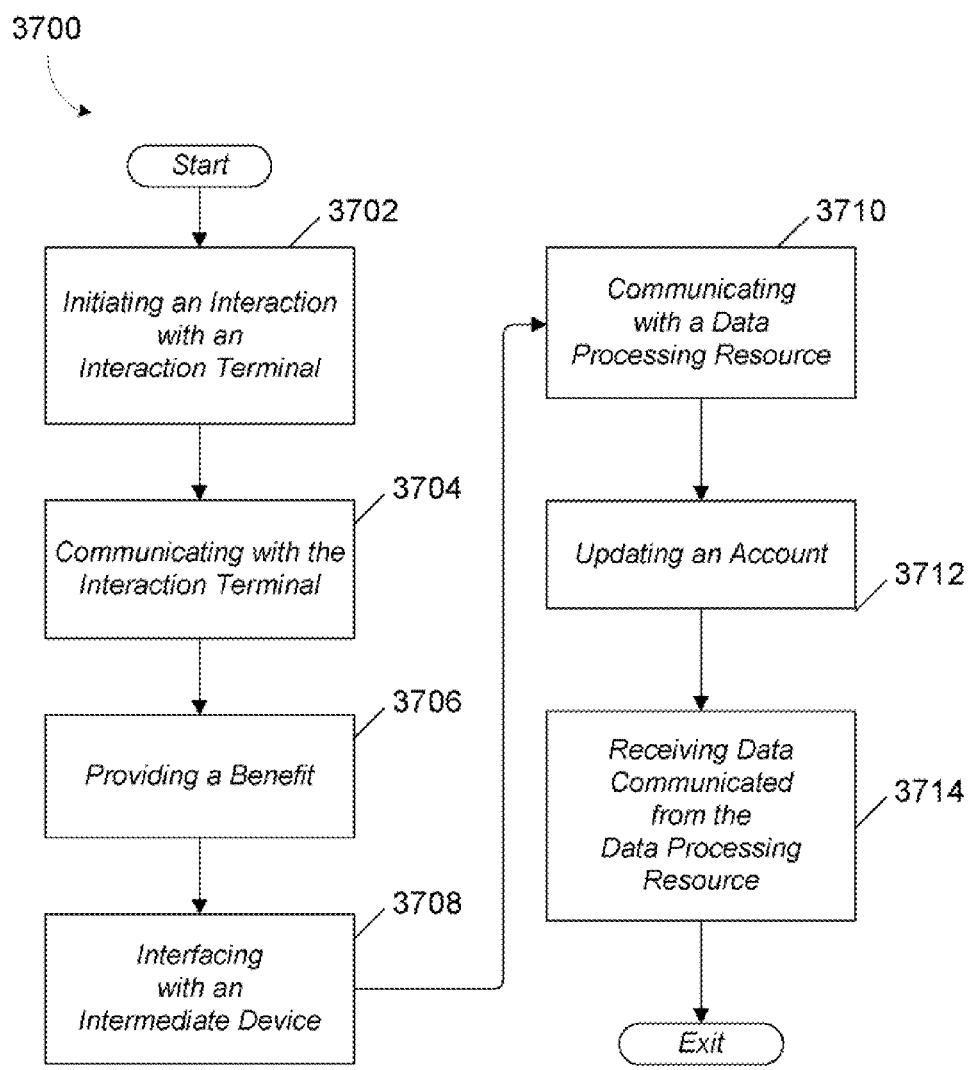
FIG. 37 is a flow diagram illustrating a method of using a personal terminal to obtain a loyalty reward, in accordance with an embodiment of the invention.

FIG. 37 is a flow diagram illustrating a method 3700 of using a personal terminal to obtain a loyalty reward and to store the loyalty reward in a data processing resource, such as a loyalty server. The personal terminal can be used to interact with a number of interaction terminals. Each interaction terminal may be considered "a touch point of loyalty," and the user may receive a loyalty reward for interacting with the interaction terminal. The loyalty reward may be uploaded to a data processing resource that administers a loyalty program. The data processing resource can process the loyalty reward and can communicate data back to the personal terminal. Such processing can include crediting the a loyalty account of the consumer based at least in part on the loyalty reward. The data sent from the data processing resource to the personal terminal can include loyalty data, credit data, consumer data, or other data. The data may enable the consumer to make a purchase or receive discounts using the loyalty reward or other account data stored on the personal terminal, or to otherwise receive loyalty rewards. The consumer may obtain loyalty rewards for interacting with the touch point of loyalty site, regardless of whether the vending or host equipment is being activated. Thus, consumer does not have to purchase products or services to obtain the loyalty reward.

The method 3700 begins in block 3702. In block 3702, an interaction with the interaction terminal is initiated. For example, the consumer with the personal terminal may approach the interaction terminal. The method 3700 then moves to block 3704. In block 3704, the personal terminal and interaction terminal communicate. The method 3700 then moves to block 3706. In block 3706, a benefit, such as a loyalty reward, is provided to the user for initiating the transaction with the interaction terminal. The method 3700 then moves to block 3708. In block 3708, the personal terminal interfaces with an intermediate device. The method 3700 then moves to block 3710. In block 3710, the personal terminal communicates with the data processing resource. Specifically, the personal terminal may communicate with the data processing resource by way of the intermediate device. Alternatively, the personal terminal may directly communicate with the data processing device, in which case block 3708 may be omitted. The loyalty data may be communicated from the personal terminal to the data processing resource, and possibly a database. The method then moves to block 3712. In block 3712, the data processing resource updates a loyalty account of the consumer. The method 3700 then moves to block 3714. In block 3714, the data processing resource communicates data to the personal terminal. The data may be intended for either the personal terminal, the interaction terminal, or a number of interaction terminals. For example, loyalty account information, consumer data, touch point of loyalty configurations, or other data may be transmitted to the personal terminal. In some cases, such data may be intended for a specific interaction terminal or a number of interaction terminals. The personal terminal can carry such data until the consumer returns to the desired interaction terminal, at which point the data received from the data processing resource may be communicated to the interaction terminal. The method 3700 then ends.

Figure 38:
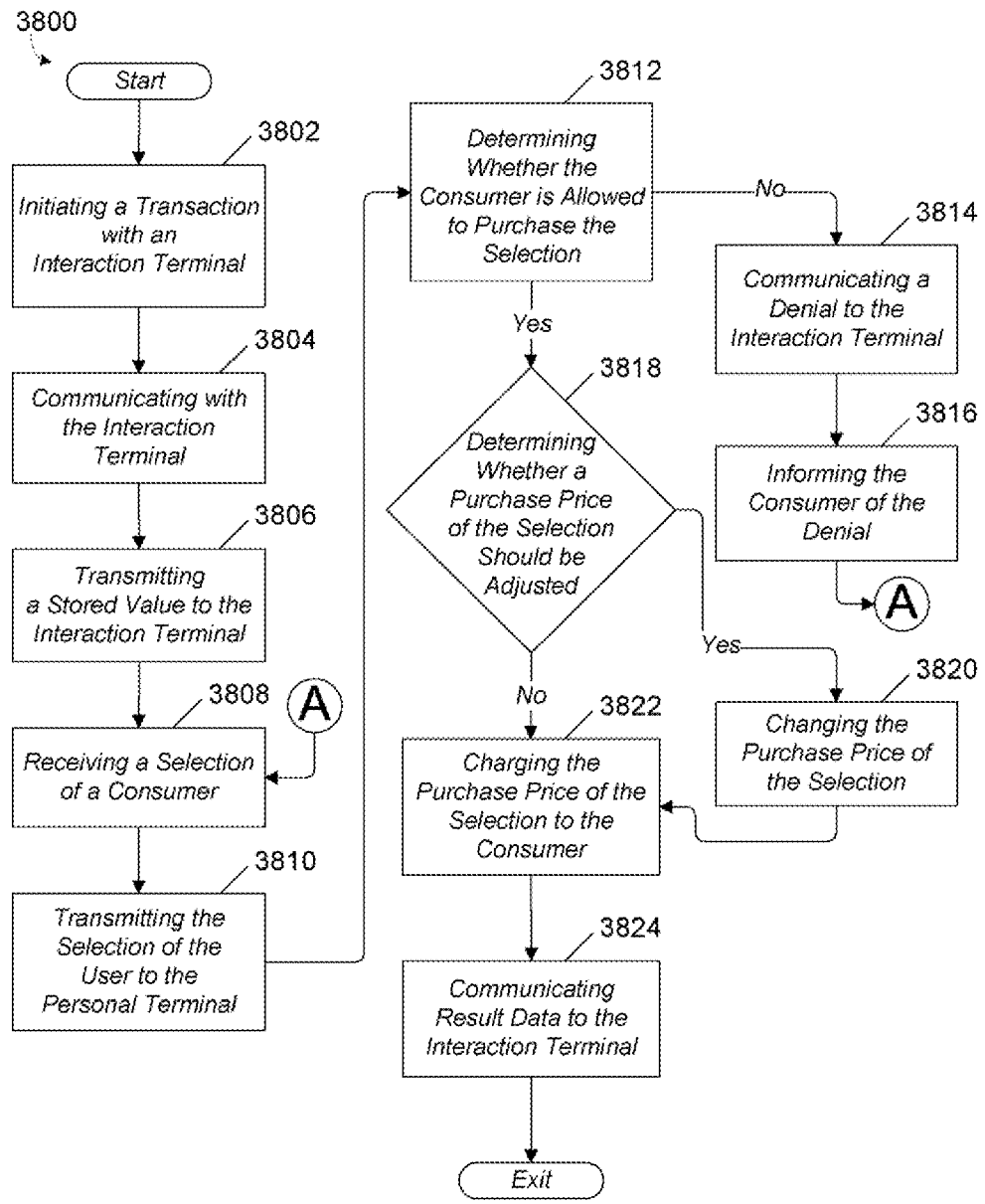
FIG. 38 is a flow diagram illustrating a method of using a personal terminal having a stored value balance to pay for products or services, in accordance with an embodiment of the invention.

FIG. 38 is a block diagram of a method 3800 of using a personal terminal to pay for products. A consumer can establish communication between the personal terminal and an interaction terminal. The interaction terminal can be operationally related to vending or host equipment, such that the consumer can elect to pay for the product from the vending or host equipment by way of a stored value balance. The stored value balance can reside on the personal terminal or may be stored on a data processing resource that is accessible to the personal terminal, such as a loyalty server.

The personal terminal can initiate a vending cycle when the personal terminal is in proximity of an interaction terminal. The interaction terminal can monitor and control the vending or host equipment. Once a vend cycle has been initiated, the consumer can select a product or service. Data can be communicated from the interaction terminal to the personal terminal, such as a selection of the consumer, or other loyalty or sale data.

The personal terminal, or the data processing resource accessible by the personal, can determine whether the sale should be authorized and whether the price should be adjusted. The personal terminal, or the data processing resource accessible by the personal terminal, may include rules for determining whether the purchase is allowable. For example, the rules may indicate the consumer can purchase certain products but not others, or the rules may indicate the consumer may only make certain purchases at certain times. Other rules are also possible.

The rules can be used to prevent certain personal terminals from being used to purchase certain foods and beverages at certain times of the day. Such rules may be determined by the consumer or by another. For example, the personal terminal may be associated with a student, and the rules may be set by a parent or guardian of the student, an administrator of a school attended by the student, or by others.

The vending or host equipment may be capable of vending all types and kinds of food all day, regulated only by the rules stored on the personal terminal or the data processing resource, instead of preventing the vending or host equipment from dispensing certain products for fixed periods of time everyday, as is the case now in many locations such as schools.

Once the transaction is authorized the personal terminal, or the data processing resource accessible by way of the personal terminal, can determine the sale price for the product or service. Different consumers may qualify for different pricing. In addition, promotions can be extended to certain consumers, and prices can be changed throughout the day. Other configurations are also possible.

The transaction can be concluded when the consumer receives the product or service and data pertaining to the transaction is communicated to the personal terminal or the data processing resource. The method 3800 begins in block 3802.

In block 3802, a transaction is initiated with an interaction terminal. The consumer having the personal terminal may approach the interaction terminal to initiate the transaction. The method 3800 then moves to block 3804. In block 3804, the personal terminal and the interaction terminal communicate. The method 3800 then moves to block 3806. In block 3806, a stored value is transmitted from the personal terminal, or from the data processing resource through the personal terminal, to the interaction terminal. The method then moves to block 3608. In block 3608, a selection of the consumer is received by the vending or host equipment. The method 3800 then moves to block 3810. In block 3810, the selection of the consumer is transmitted from the vending or host equipment to the personal terminal, or the data processing resource by way of the personal terminal, so that the transaction may be approved or denied. For example, the transaction may be approved or denied based on how the product or service is to be paid for, such as by a deduction from the stored value, an extension of credit, or some other form of payment. The method 3800 then moves to block 3812.

In block 3812, a determination is made as to whether the consumer is allowed to purchase the selected product or service at the current time. If the consumer is allowed to purchase the product or service, the method moves to block 3818. If not allowed to purchase the product, the method moves to block 3814.

In block 3814, a denial is communicated to the interaction terminal. The method 3800 then moves to block 3816. In block 3816, the consumer is informed that the transaction is denied, meaning the product or service is not allowed to be vended at this time. The method 3800 then returns to block 3808, so that the consumer can enter another selection.

In block 3818 a determination is made as to whether a purchase price should be adjusted. If the transaction is a promotional sale or an adjusted price sale, the method 3800 moves to block 3820. If the transaction is not a promotional sale or an adjusted price sale, the method 3800 moves to block 3822.

In block 3820 the purchase price of the selection is changed. The method 3800 then moves to block 3822. In block 3822, the purchase price of the selection is charged to the consumer. Decisions to deduct from stored value, extend credit, and/or otherwise determine how the products or services are to be paid for by the consumer or others can be determined. The method 3800 then moves to block 3824. In block 3824, result data is communicated to the interaction terminal. The result data may include vend approved, sales price, or other sales data. The vending or host equipment completes the transaction, the consumer receives the purchased product or service, and the method 3800 ends.

Figure 39:
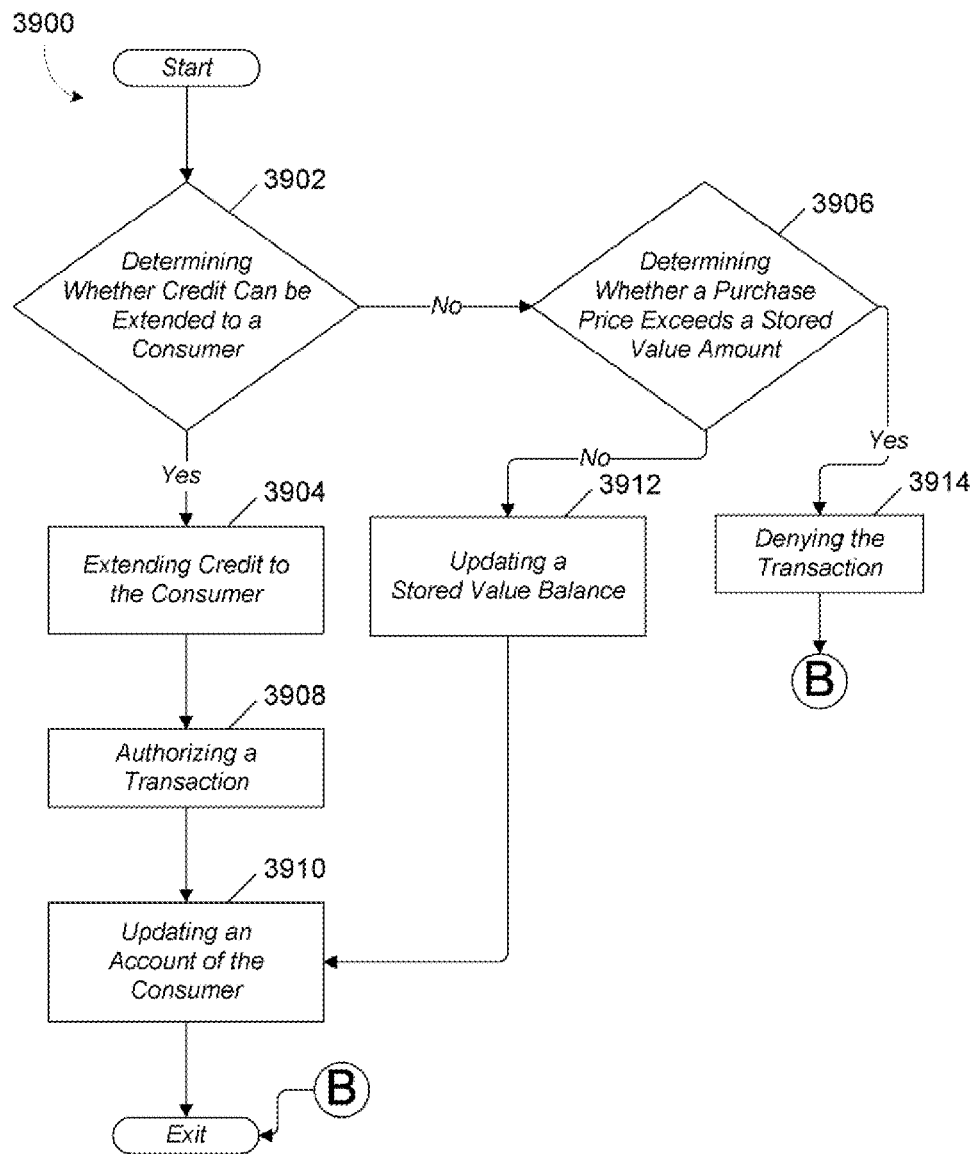
FIG. 39 is a flow diagram of a method of using a personal terminal to purchase a product or service, the personal terminal having a stored value balance and an extended credit feature, in accordance with an embodiment of the invention.

FIG. 39 is a block diagram of a method 3900 of using a personal terminal to purchase a product or service, the personal terminal having a stored value balance and an extended credit feature. When the consumer selects a product or service, a determination is made as to whether the stored value balance is sufficient to purchase the selection. Though the stored value balance may be sufficient for the purchase, depleting the stored value balance indirectly prevents the consumer from making additional purchases using the stored value balance. Thus, credit may be extended to the consumer, as a way of preserving the stored value balance, so that the consumer can purchase additional products or services.

Before credit is extended, a determination is made as to whether such an action is appropriate. Past purchase experience, the configuration of the personal terminal and other criteria can be considered. The extended credit may be repaid from an account of the consumer when the personal terminal next communicates with the data processing resource, such as the loyalty server. Thus, the account of the consumer can be charged to resolve the credit, and the stored value balance can be replenished or otherwise adjusted. The method 3900 begins in block 3902.

In block 3902 a determination is made as to whether credit can be extended to the consumer for the selection of the transaction. If the selection can be paid for by extending credit, the method 3900 moves to block 3904. If the selection cannot be paid for by extending credit, the method 3900 moves to block 3906.

In block 3904, credit is extended to the consumer. Because the selected product or service is purchased with the extended credit, the stored value balance is preserved, allowing a subsequent purchase by the consumer using the stored value. The method then moves to block 3908. In block 3908, the transaction is authorized by the personal terminal or the data processing resource, and the authorization is sent to the interaction terminal. The method 3900 then moves to block 3910.

In block 3910, an account of the consumer is updated. For example, the account may be located on the data processing resource, and the account may be updated when the personal terminal next communicates with the data processing resource. The extended credit may be paid from the account, adjustments to the stored value balance may be made, and settings or criteria for extending credit may be updated. The method 3900 then ends.

Referring back to block 3902, if credit is not extended to the consumer, the method 3900 moves to block 3906. In block 3906, a determination is made as to whether the purchase price of the selection is greater than the stored value balance associated with the personal terminal. If the purchase price is greater than the stored value balance, the method 3900 moves to block 3912. If the purchase price is not greater than the stored value balance, the method 3900 moves to block 3914. In block 3912, the stored value balance is updated to reflect the purchase of the product or service. For example, the purchase price of the selection may be deducted from the stored value balance, leaving a relatively smaller stored value balance remaining on the personal terminal. The method 3900 then moves to block 3910, where the account of the consumer is updated. In block 3914, the transaction is denied. The denial is communicated to the interaction terminal. The method 3900 then ends.

Figure 40:
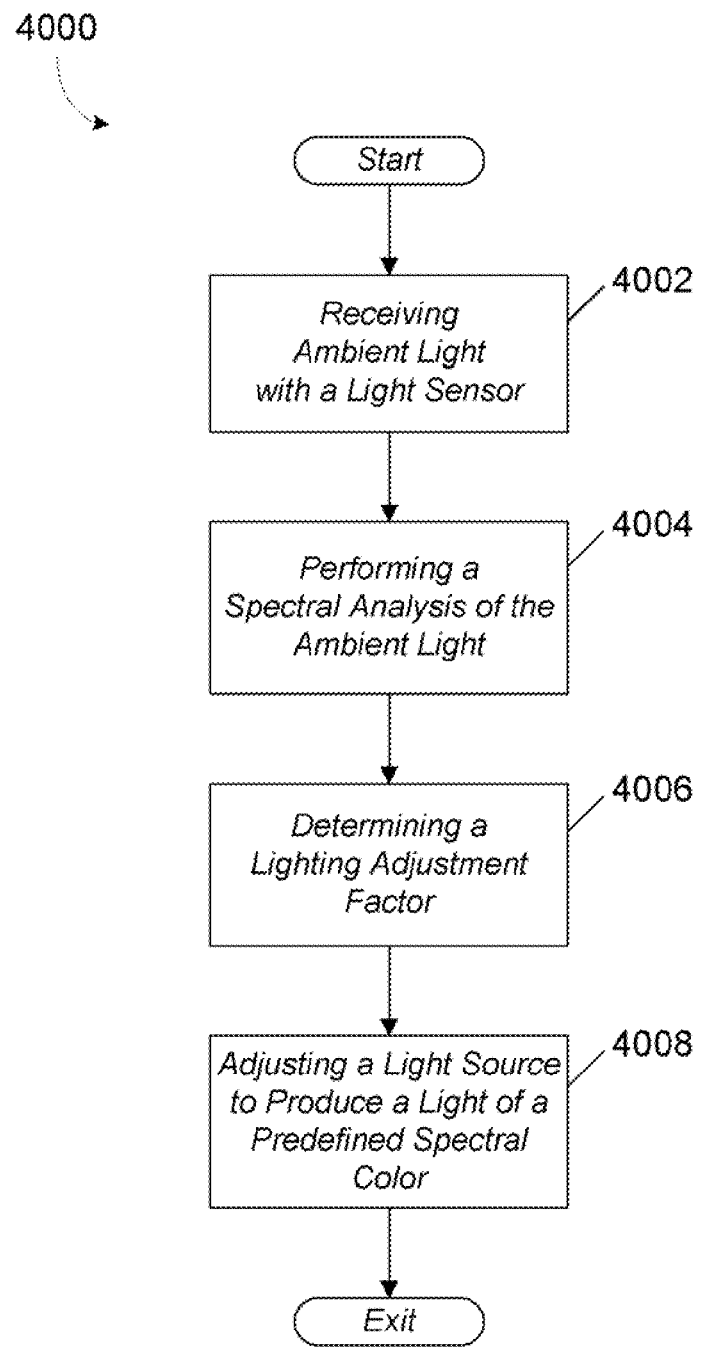
FIG. 40 is a flow diagram of a method of lighting a personal terminal to a predefined color, in accordance with an embodiment of the invention.

FIG. 40 is a flow diagram of a method 4000 of lighting a personal terminal to a predefined color. The method 4000 may light the personal terminal to the predefined color regardless of the ambient lighting conditions or the color of the material used to form the personal terminal. A light sensor may measure the spectral qualities of ambient light passing through the material and may determine a lighting adjustment factor. A light source may be operated at least in part based on the lighting adjustment factor, so that the predefined color is produced through the material.

The predefined color may be a color associated with a particular product, brand, or entity. The predefined color may also signify social or emotional aspects of the consumer, or the predefined color may have promotional, operational, or informational purposes. For example, the personal terminal may become one color for men and another for women. In addition, the personal terminal may change color to indicate a relationship status of the consumer, such as single or married. The personal terminal may also use color to indicate moods of the consumer, such as happy or sad. Other color indications are possible, such as the astrological sign of the consumer. In some cases, the consumer may change the illuminated color of the personal terminal, such as to reflect the wants, needs, mood, feelings, social status, or desires of the consumer.

The method 4000 begins in block 4002. In block 4002, the ambient light near the light source is received by the light sensor. The method 4000 then moves to block 4004. In block 4004, a spectral analysis is performed on the ambient light received by the light sensor. The method 4000 then moves to block 4006. In block 4006, a lighting adjustment factor is determined. The lighting adjustment factor may be determined based at least in part on the spectral analysis of the ambient light received by the light sensor. The lighting adjustment factor may indicate the amount of red, green, and blue to be associated with the light from the light source, such that light of the predefined color is produced when light from the light source combines with ambient light passing through the personal terminal. The method 4000 then moves to block 4008. In block 4008, the light source is adjusted to produce the predefined color based on the lighting adjustment factor determined in block 4006. The method 4000 then ends. The method 4000 enables lighting a personal terminal made from a particular material to a predefined color in varying environmental lighting conditions. Such predefined color variations enable the personal terminal to match company trademark colors, as well as other colors.

Figure 41:
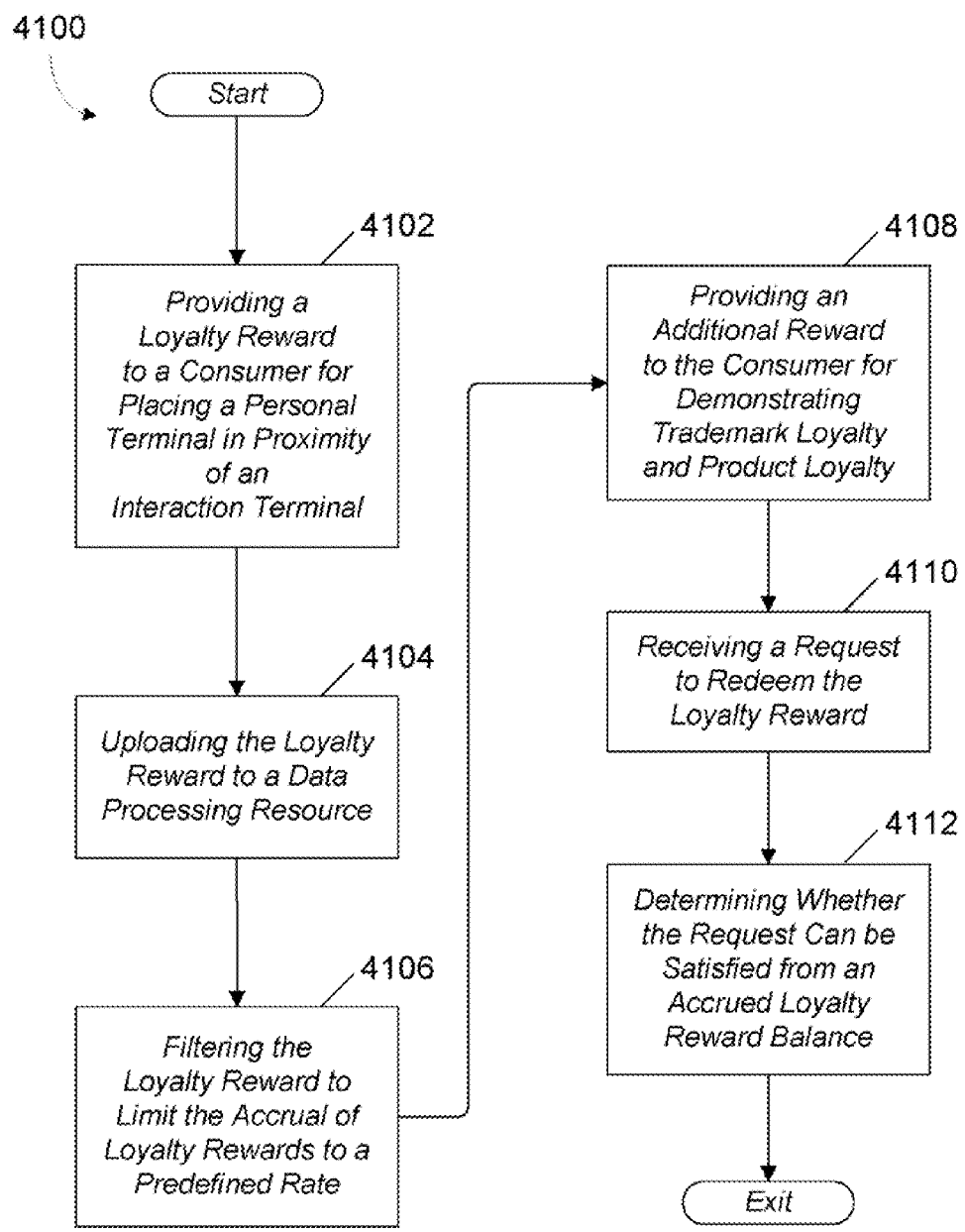
FIG. 41 is a flow diagram of a method of using touch points of loyalty to a reward consumer, in accordance with an embodiment of the invention.

FIG. 41 is a block diagram of a method 4100 of using touch points of loyalty reward a consumer. The method 4100 may also enhance trademark prominence and increase immediate consumption sales across a portfolio of products. The consumer may demonstrate trademark loyalty without making a purchase. Such trademark loyalty can be rewarded by providing a loyalty reward in response to the personal terminal communicating with the interaction terminal. The loyalty reward can then be uploaded to a data processing resource, such as a loyalty server, which may filter the loyalty reward to minimize abuses and fraudulent activities.

Loyalty rewards can be accrued, and when a suitable balance has accrued, the consumer may redeem the loyalty rewards. The loyalty rewards can be redeemed online for products and services. In addition, the loyalty rewards can also be carried in the personal terminal and can be redeemed at the vending or host equipment, in embodiments in which the interaction terminal is operationally related to the vending or host equipment. Furthermore, additional loyalty rewards or promotional rewards can be given to the consumer.

The interaction terminal can be affixed on any vending or host equipment. Additionally, interaction terminals can be located in a variety of locations where an entity's portfolios of products are sold. The consumer may recognize the interaction terminal and may be drawn to it to obtain a loyalty reward, demonstrating trademark loyalty. Once there, the consumer may discover the products that the entity is selling and in a demonstration of product loyalty may choose to purchase some of the products.

Trademark loyalty first rewards the consumer and then presents the company's products to the consumer. In certain cases the consumer may not be aware that the product is in the company's portfolio of products and as such the interaction terminal serves as a way in which to inform the consumer about the product. In another case, the consumer may be aware that the company makes the product but has never tried the product and today this consumer decides to try the product. In another case, the consumer might be aware that the company makes the product but was not aware that the product was sold in this location. In another case, the consumer may be outside the store (such as a gas station) and having the knowledge that the interaction terminal is in the store decides to enter the store after pumping gas to pick up a loyalty reward. In this example, the incentive of the loyalty reward gets the consumer to enter the store. In another case, the consumer may have loyalty rewards stored on the personal terminal and may decide to redeem the loyalty rewards for a free product. Thus, the personal terminal and the interaction terminal operate together to effectuate a loyalty program that may be focused on trademark loyalty and may not require the consumer to purchase anything to obtain a loyalty reward by approaching the interaction terminal.

Furthermore, additional loyalty rewards or promotional awards can be given to the consumer when the consumer demonstrates trademark loyalty and product loyalty. For example, when a consumer acquires a loyalty reward from an interaction terminal without making a purchase, the consumer demonstrates trademark loyalty. When the consumer purchases a product, the consumer demonstrates product loyalty. When the consumer demonstrates both trademark loyalty and product loyalty, the consumer may receive an additional reward. The personal terminal can be responsible for recording both trademark loyalty and product loyalty activities. Alternatively, a combination of data processing devices can record trademark loyalty and product loyalty, and associate such activity with the consumer and/or the personal terminal. The method begins in block 4100 of FIG. 41.

In block 4102, a loyalty reward is provided to the consumer for placing a personal terminal in proximity of an interaction terminal. The consumer demonstrates trademark loyalty by using the personal terminal to obtain loyalty rewards from a number of interaction terminals. Purchase may not be required. The interaction terminals are located on vending or host equipment, and in other locations where the company's portfolios of products are available. The method 4100 then moves to block 4104.

In block 4104, the loyalty reward is uploaded to a data processing resource. The method 4100 then moves to block 4106. In block 4106, the loyalty reward is filtered to limit the accrual of loyalty rewards to a predefined rate. Therefore, the consumer may obtain loyalty rewards from the interaction terminal at a rate that is no faster than the predefined rate. Such a predefined rate can be daily, although any rate is possible. Such a configuration reduces repeated visits to the same vending or host equipment too frequently. The method 4100 then moves to block 4108.

In block 4108, additional rewards or promotional offers are provided to the consumer for demonstrating trademark loyalty and product loyalty. When it is determined that a consumer has demonstrated both trademark loyalty and product loyalty, an additional reward can optionally be offered to the consumer. The method 4100 then moves to block 4110.

In block 4110, a request is received to redeem the loyalty reward. For example, the consumer can trade at least a portion of the accrued loyalty reward balance for products or services online, or for products or services available from the vending or host equipment, in cases in which the vending or host equipment is operationally related to the interaction terminal. In block 4112, it is determined whether the request can be satisfied from the accrued loyalty reward balance. The method 4100 ends.

Figure 42:
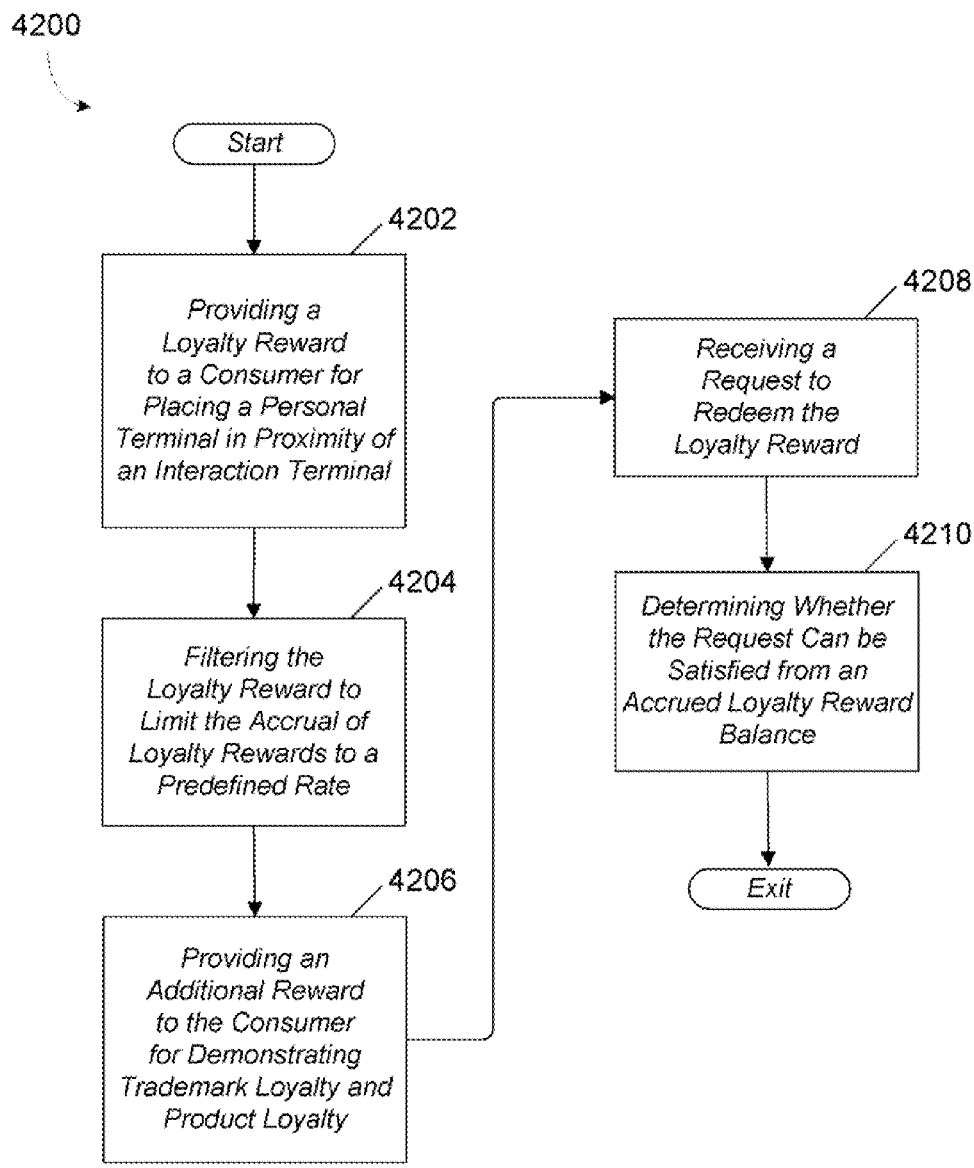
FIG. 42 is a flow diagram of a method of using touch points of loyalty to enhance trademark prominence, reward consumers, and increase immediate consumption sales across a portfolio of products, in accordance with an embodiment of the invention.

FIG. 42 is a block diagram of a method 4200 of using touch points of loyalty to reward consumers. The method 4200 may also enhance trademark prominence and increase immediate consumption sales across a portfolio of products. The method 4200 differs from the method 4100 of FIG. 41 in that a data processing resource is not provided. A consumer may demonstrate trademark loyalty without making a purchase. Such loyalty on the part of the consumer can be rewarded by allowing the personal terminal to acquire a loyalty reward for communicating with an interaction terminal. The loyalty reward, however, may be filtered at the personal terminal to minimize abuses and fraudulent activities. The loyalty reward can be added to an accrued loyalty reward balance, and when an appropriate balance has been earned, the consumer can be allowed to redeem the rewards. The loyalty rewards can be redeemed online for products or services, or the loyalty rewards can be redeemed at the vending or host equipment, if the interaction terminal is operationally related to the vending or host equipment.

Additional loyalty rewards or promotional awards may be given to the consumer when the consumer demonstrates trademark loyalty and product loyalty. When the consumer acquires a loyalty reward, the consumer demonstrates trademark loyalty. When the consumer purchases a product, the consumer demonstrates product loyalty. When the consumer demonstrates both trademark loyalty and product loyalty, the consumer may receive an additional loyalty reward. The personal terminal may be responsible for recording both trademark loyalty and product loyalty activities. Alternatively, a combination of data processing devices can record trademark loyalty and product loyalty and associate such activity with the consumer or the personal terminal. The method 4200 begins in block 4202.

In block 4202, a loyalty reward is provided to the consumer for placing a personal terminal in proximity of the interaction terminal. The consumer collects, by way of personal terminal, loyalty rewards from a number of interaction terminals. Purchase may not be required. The interaction terminals are affixed on vending or host equipment and in other locations where company's portfolios of products are available. The method 4200 then moves to block 4204.

In block 4204, the loyalty reward is filtered to limit the accrual of loyalty rewards to a predefined rate. Therefore, the consumer gains a benefit from the interaction terminal at a rate that is no faster than the predefined rate. Such a predefined rate can be daily, although any rate is possible. Such a configuration reduces repeat visits to the same vending or host equipment too frequently. The method 4200 then moves to block 4206.

In block 4206, additional rewards or promotional offers are provided to the consumer for demonstrating trademark loyalty and product loyalty. When it is determined that a consumer has demonstrated both trademark loyalty and product loyalty, an additional reward can optionally be offered to the consumer. The method 4200 then moves to block 4208.

In block 4208, a request is received to redeem the loyalty reward. For example, the consumer can trade at least a portion of the accrued loyalty reward balance for products or services online, or for products or services available from the vending or host equipment. The method 4200 then moves to block 4210. In block 4210, it is determined whether the request can be satisfied from the accrued loyalty reward balance. The method 4200 then ends.

The systems and methods described above can be implemented in software, firmware, hardware or any combination thereof. One or more components can be included in an article of manufacture having a computer readable medium. The computer readable medium may have embodied therein a computer readable program.

While particular embodiments of have been disclosed in detail in the foregoing description and figures for purposes of example, those skilled in the art will understand that variations and modifications may be made without departing from the scope of the disclosure. For example, blocks of certain figures may be performed in any order, and certain blocks may be added, deleted, or modified. All such variations and modifications are intended to be included within the scope of the present disclosure, as protected by the following claims.

The claimed invention is:

1. A system for implementing a loyalty program, the system comprising:
    a personal terminal comprising a housing sized and shaped to be carried by a user;
    a first interaction terminal physically attached to a first product, the first interaction terminal and the personal terminal establishing a communication when the personal terminal is transported within physical proximity of the first interaction terminal;
    a second interaction terminal physically attached to a second product, the second interaction terminal and the personal terminal establishing a communication when the personal terminal is transported within physical proximity of the second interaction terminal; and
    a loyalty module that provides a benefit to the user in response to the communication between the personal terminal and one of the second and first interaction terminals, the benefit provided to reward the user for transporting the personal terminal within physical proximity of one of the first and second products without regard to whether the user purchases the product.

2. The system of claim 1, wherein the personal terminal comprises a radio-frequency identification (RFID) reader device and one of the first and second interaction terminals comprises a radio-frequency identification (RFID) tag device.

3. The system of claim 1, wherein the personal terminal communicates with one of the first and second interaction terminals using infrared signals.

4. The system of claim 1, wherein one of the first and second products is a beverage.

5. The system of claim 1, wherein the benefit comprises at least one of the following: a loyalty point, a monetary value, and a credit toward at least a portion of the product or a service.

6. The system of claim 1, further comprising a loyalty server, wherein:
    the loyalty server comprises an account associated with the user; and
    the loyalty module stores an indication of the benefit in the account of the user.

7. The system of claim 6, wherein the loyalty server further comprises a user interface, the user interface receiving an instruction to redeem the benefit from the user.

8. The system of claim 6, wherein the personal terminal communicates with the loyalty server over a network.

9. The system of claim 1, wherein the loyalty module varies the benefit based on a pre-defined criteria, the pre-defined criteria being at least one of the following: time, location, product, brand, frequency, quantity, and price.

10. A system for implementing a loyalty program, the system comprising:
    a personal terminal comprising a housing sized and shaped to be carried by a user;
    an first interaction terminal physically attached to or operationally integrated with a first product device, the first product device providing a product or service, the first interaction terminal and the personal terminal establishing a communication when the personal terminal is transported within physical proximity of the first interaction terminal;
    an second interaction terminal physically attached to or operationally integrated with a second product device, the second product device providing a product or service, the second interaction terminal and the personal terminal establishing a communication when the personal terminal is transported within physical proximity of the second interaction terminal; and
    a loyalty module that provides a benefit to the user in response to the communication between the personal terminal and one of the first and second interaction terminals, the benefit provided to reward the user for transporting the personal terminal within physical proximity of one of the first and second product devices without regard to whether one of the first and second product devices facilitated access to one of the first and second products or services.

11. The system of claim 10, wherein one of the first and second product devices that provides one of the first and second products or services comprises one of the following: a vending machine, a product dispenser, a fountain machine, and a cooler.

12. The system of claim 10, wherein the loyalty module authorizes a transaction at one of the first and second, product devices.

13. A system for implementing a loyalty program, the system comprising:
   a personal terminal comprising a housing sized and shaped to be carried by a user;
   an first interaction terminal physically attached to or operationally integrated with a first transaction device, the first transaction device receiving payment for a product or service, the first interaction terminal and the personal terminal establishing a communication when the personal terminal is transported within physical proximity of the first interaction terminal;
   an second interaction terminal physically attached to or operationally integrated with a second transaction device, the second transaction device receiving payment for a product or service, the second interaction terminal and the personal terminal establishing a communication when the personal terminal is transported within physical proximity of the second interaction terminal; and
   a loyalty module that provides a benefit to the user in response to the communication between the personal terminal and one of the first and second interaction terminals, the benefit provided to reward the user for transporting the personal terminal within physical proximity of one of the first and second transaction devices without regard to whether one of the first and second transaction devices received payment for the product or service.

14. The system of claim 13, wherein one of the first and second transaction devices comprises one of the following: a vending machine, cash register, a credit card machine, a debit card machine, a cash acceptance device, a cash transaction device, a cashless transaction device, an automatic teller machine, a point-of-sale terminal, a computer system, a website, and a property management system.

15. The system of claim 13, wherein the loyalty module transmits a payment instruction to one of the first and second transaction devices.

16. The system of claim 13, wherein the payment instruction comprises at least one of the following: a debit from an accrued loyalty reward balance, a debit from a pre-paid cash balance, a credit card number, and a debit card number.

17. A system for providing a benefit to a user, the system comprising:
   a first interaction terminal physically mounted to a first product device;
   a second interaction terminal operationally integrated with a second product device;
   a personal terminal comprising a housing sized and shaped to be carried by the user, the personal terminal and the first interaction terminal establishing a first communication when in physical proximity of each other, and the personal terminal and the second interaction terminal establishing a second communication when in physical proximity of each other; and
   a loyalty module that provides a benefit to the user, the loyalty module providing the benefit in response to one of the first and second communications.

18. The system of claim 17, wherein the loyalty module transmits a payment instruction to the second device via the second interaction terminal.

19. The system of claim 17, further comprising a loyalty server, wherein:
   the loyalty server comprises an account associated with the user; and
   the loyalty module stores an indication of the benefit in the account of the user.

20. The system of claim 17, wherein the loyalty server further comprises a user interface, the user interface receiving an instruction to redeem the benefit from the user.

* * * * *